W. F. McCALEB.
COMBINED ADDING AND LISTING MACHINE.
APPLICATION FILED FEB. 1, 1915. RENEWED AUG. 15, 1919.

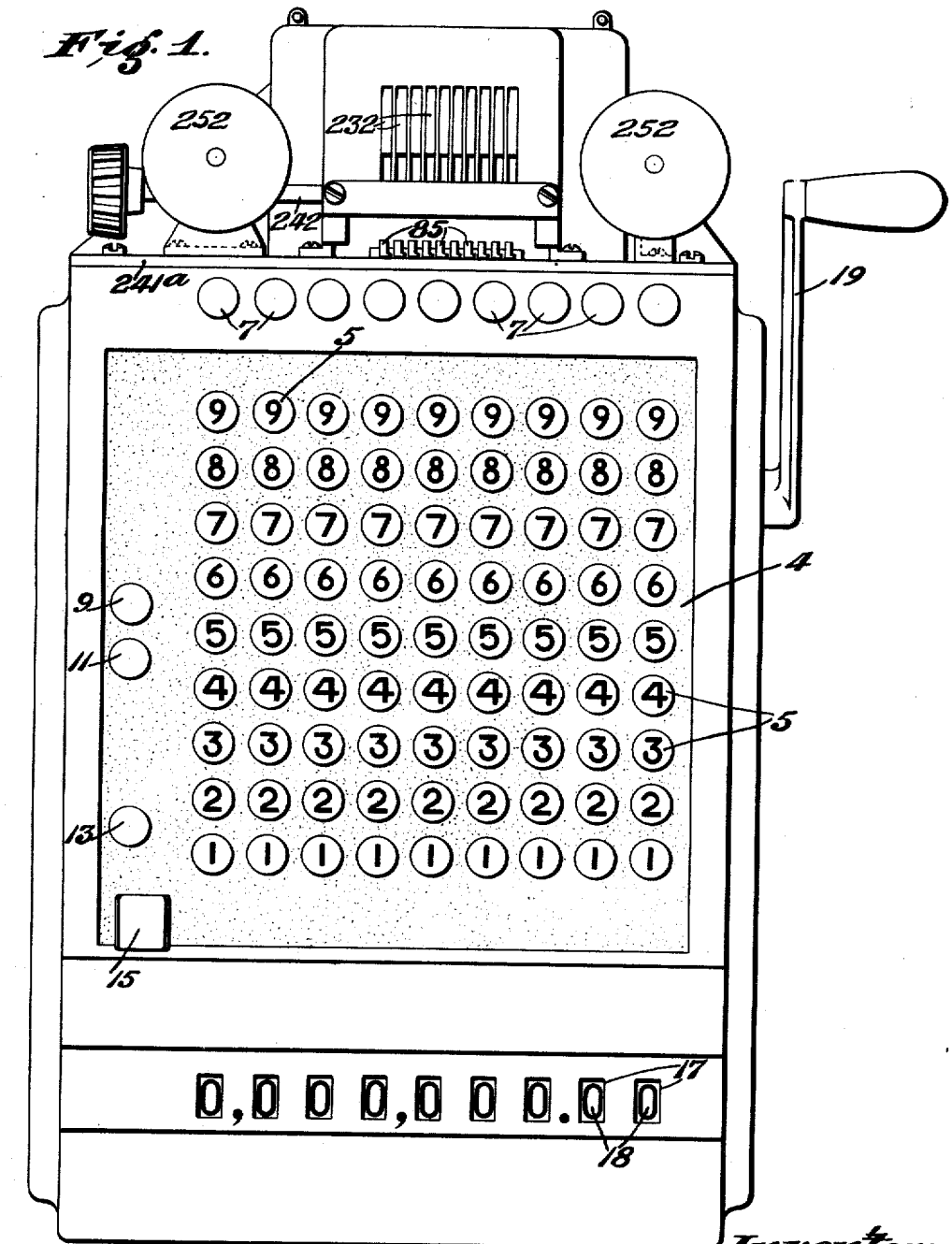

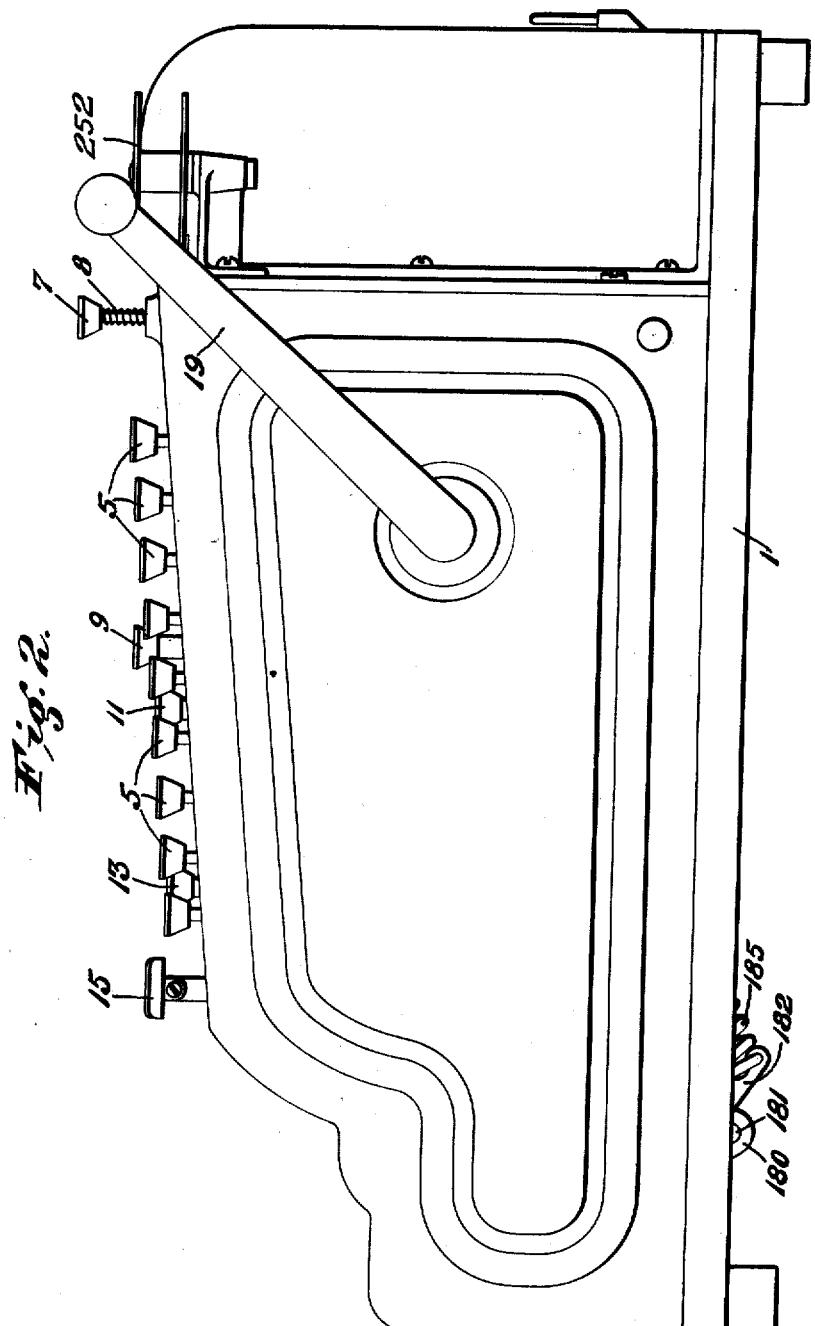

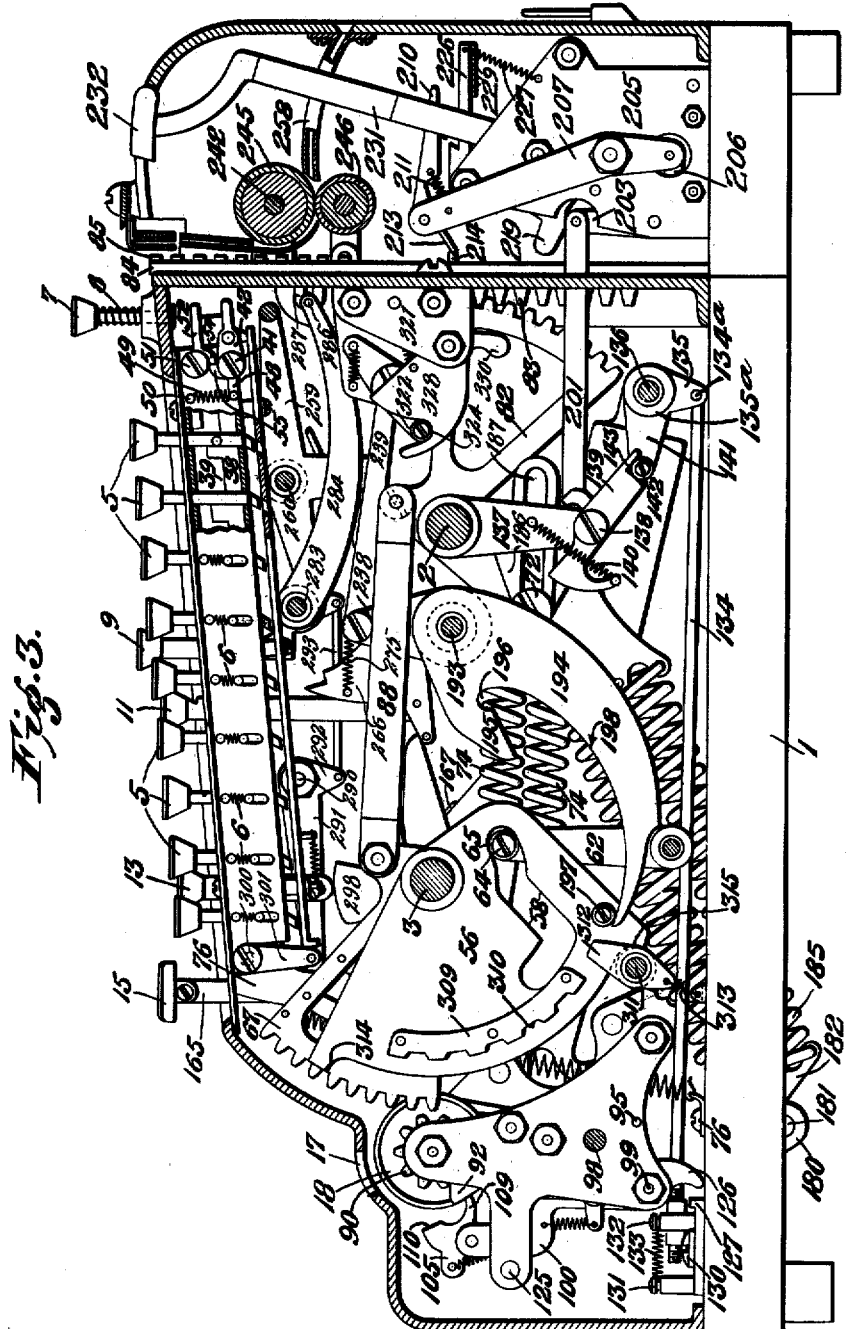

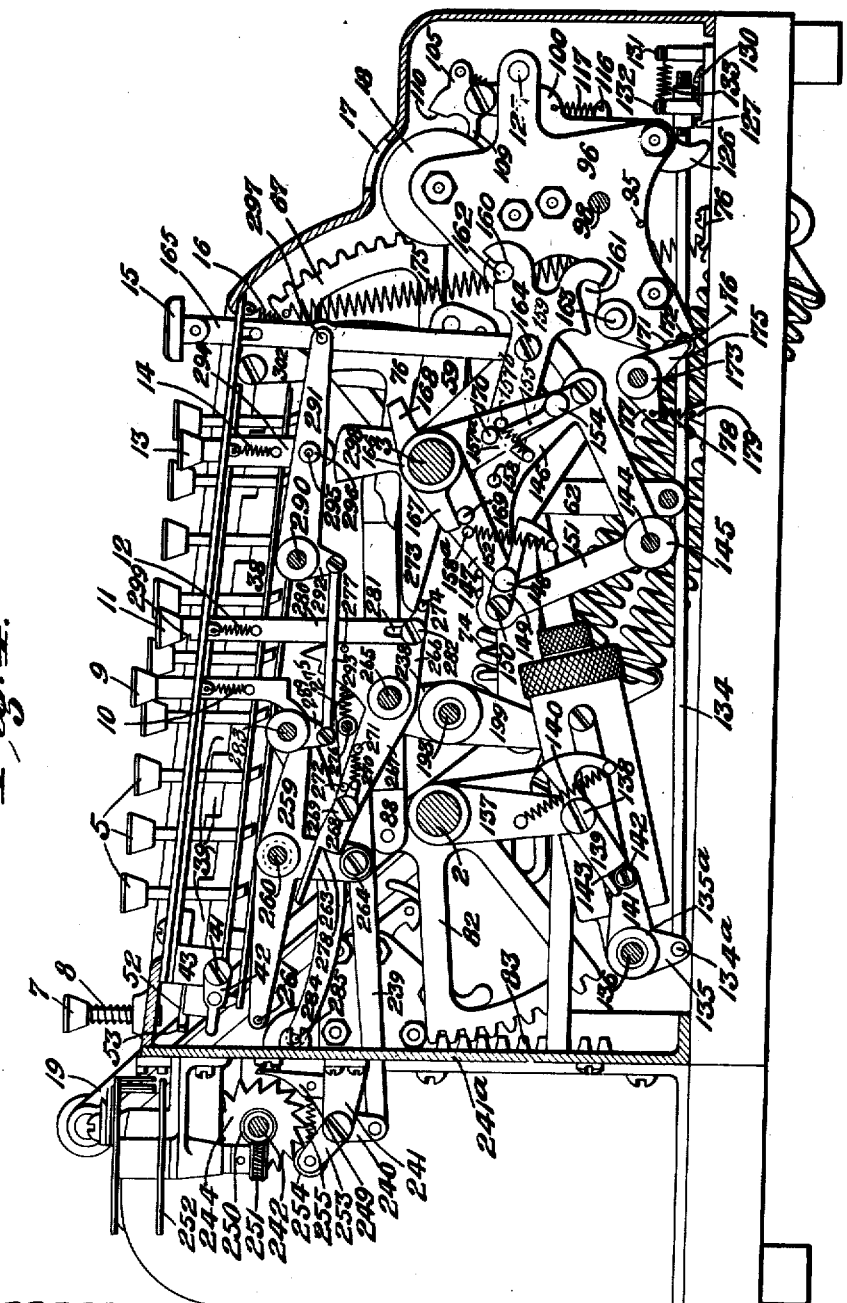

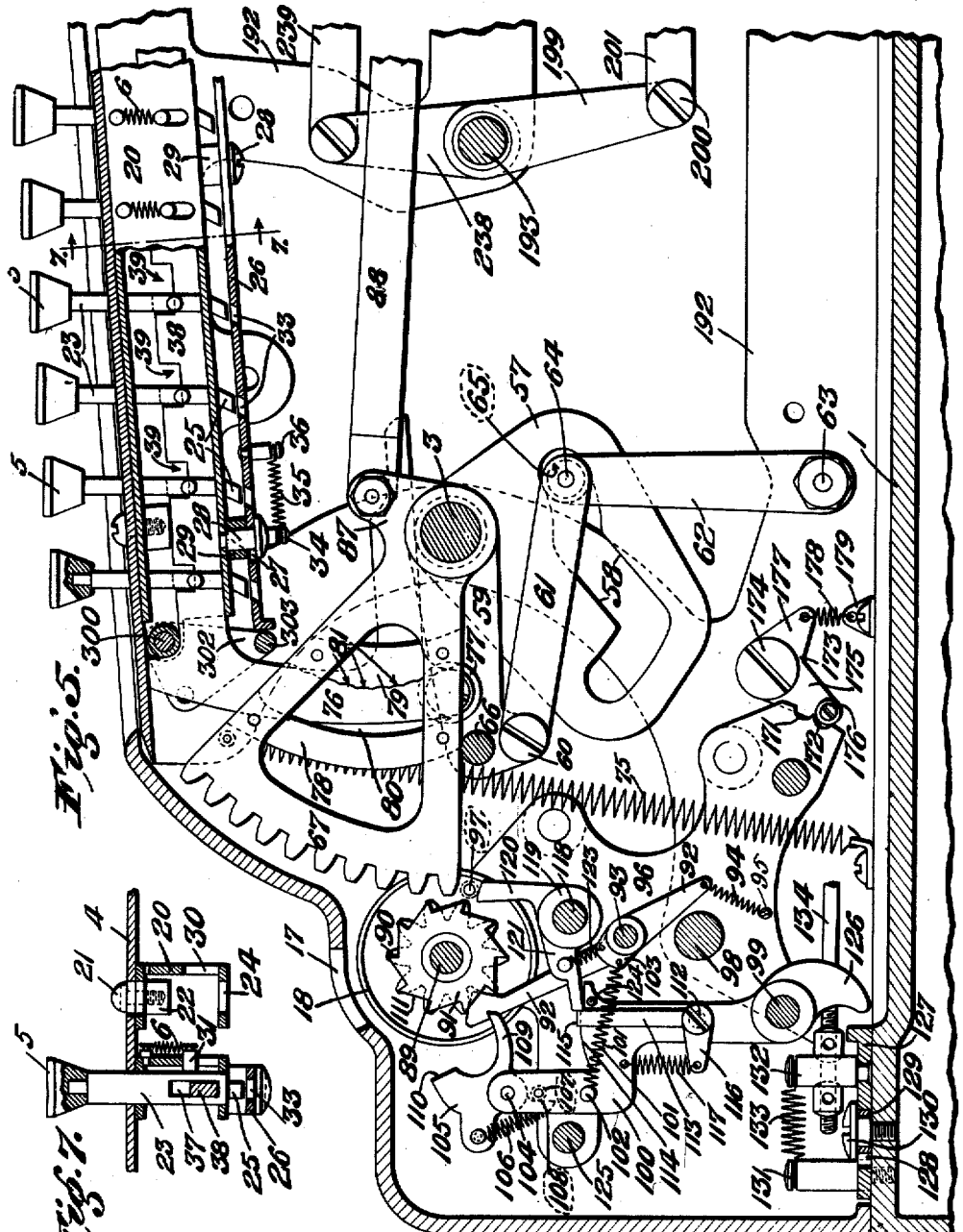

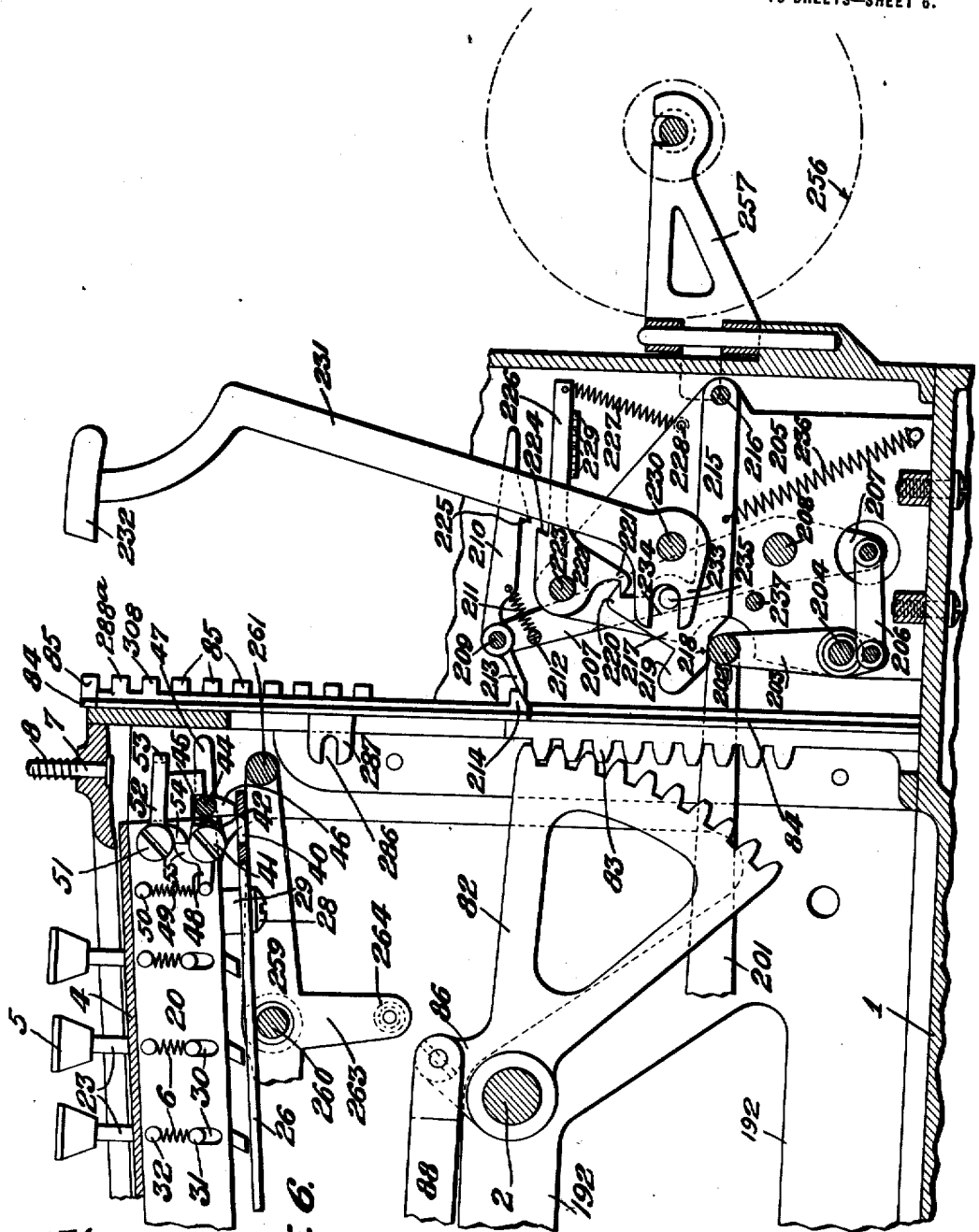

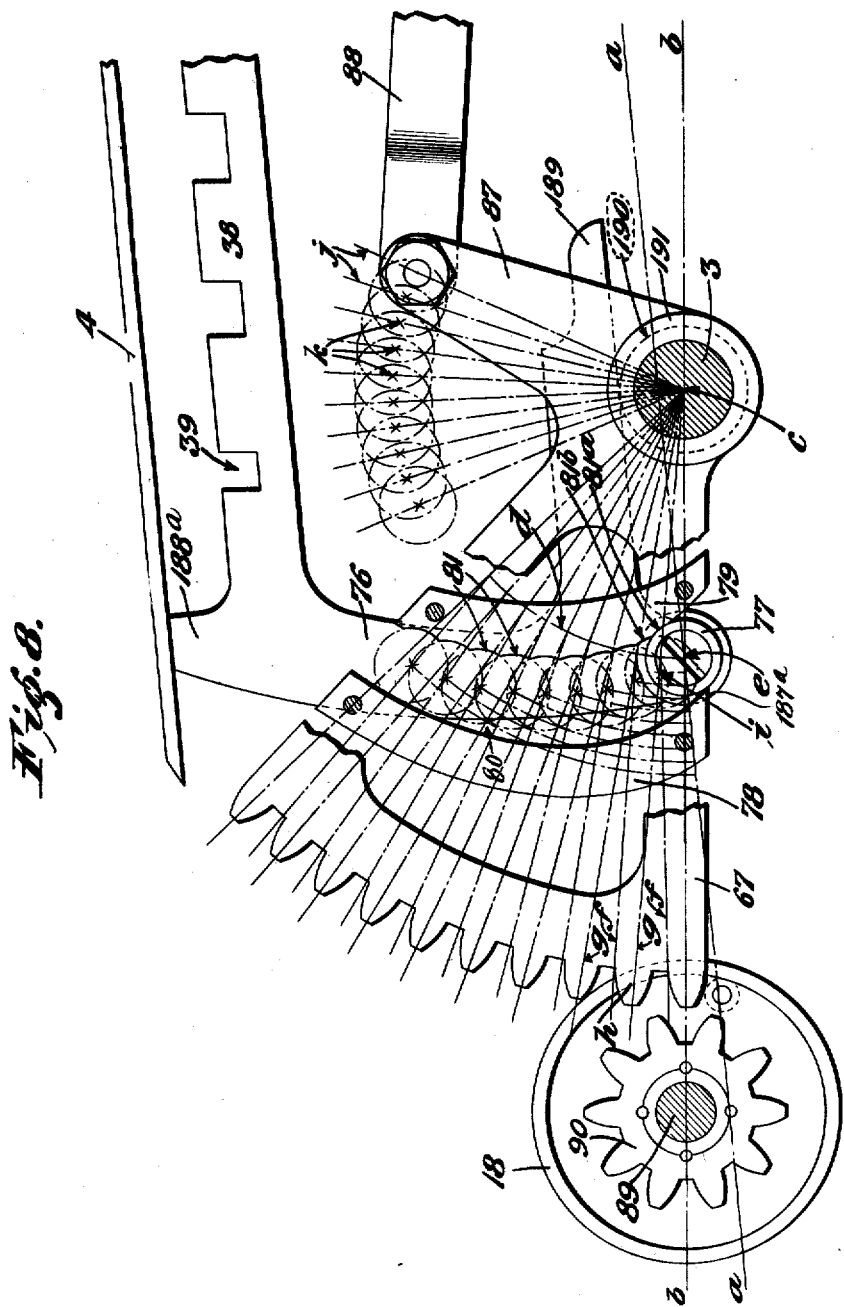

1,337,844.

Patented Apr. 20, 1920.
13 SHEETS—SHEET 8.

Witnesses:
G. A. Pennington
Stella Hill

Inventor:
Walter F. McCaleb,
By
Atty

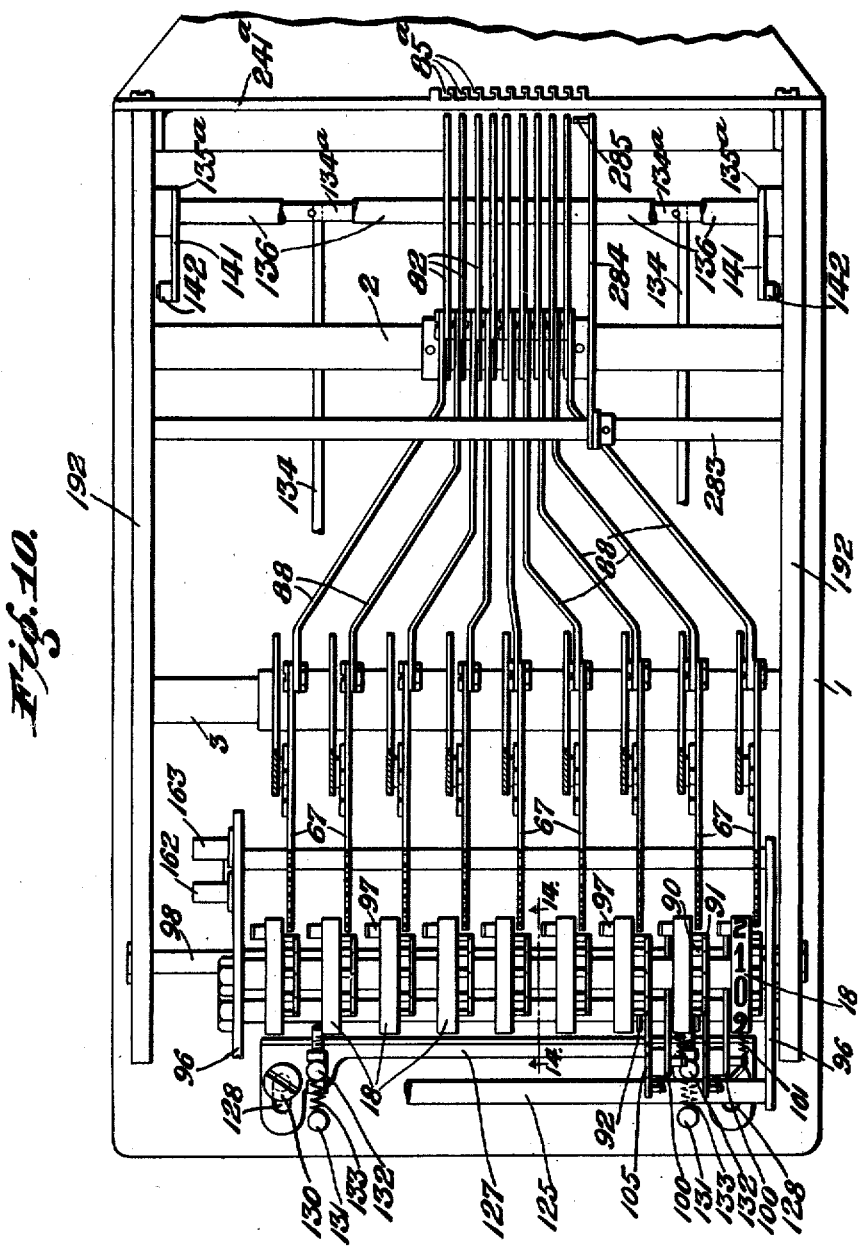

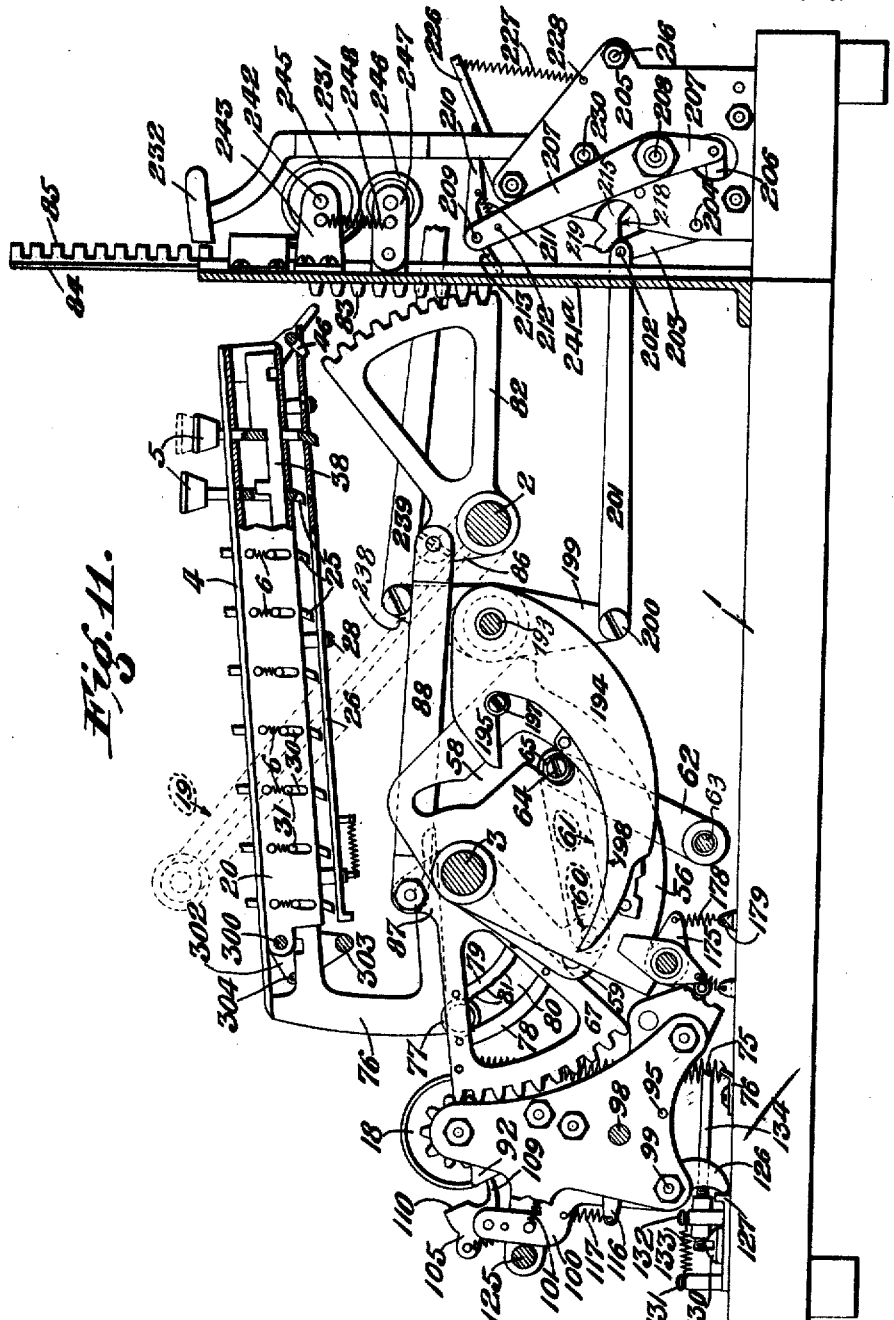

W. F. McCALEB.
COMBINED ADDING AND LISTING MACHINE.
APPLICATION FILED FEB. 1, 1915. RENEWED AUG. 15, 1919.
1,337,844.
Patented Apr. 20, 1920.
13 SHEETS—SHEET 11.
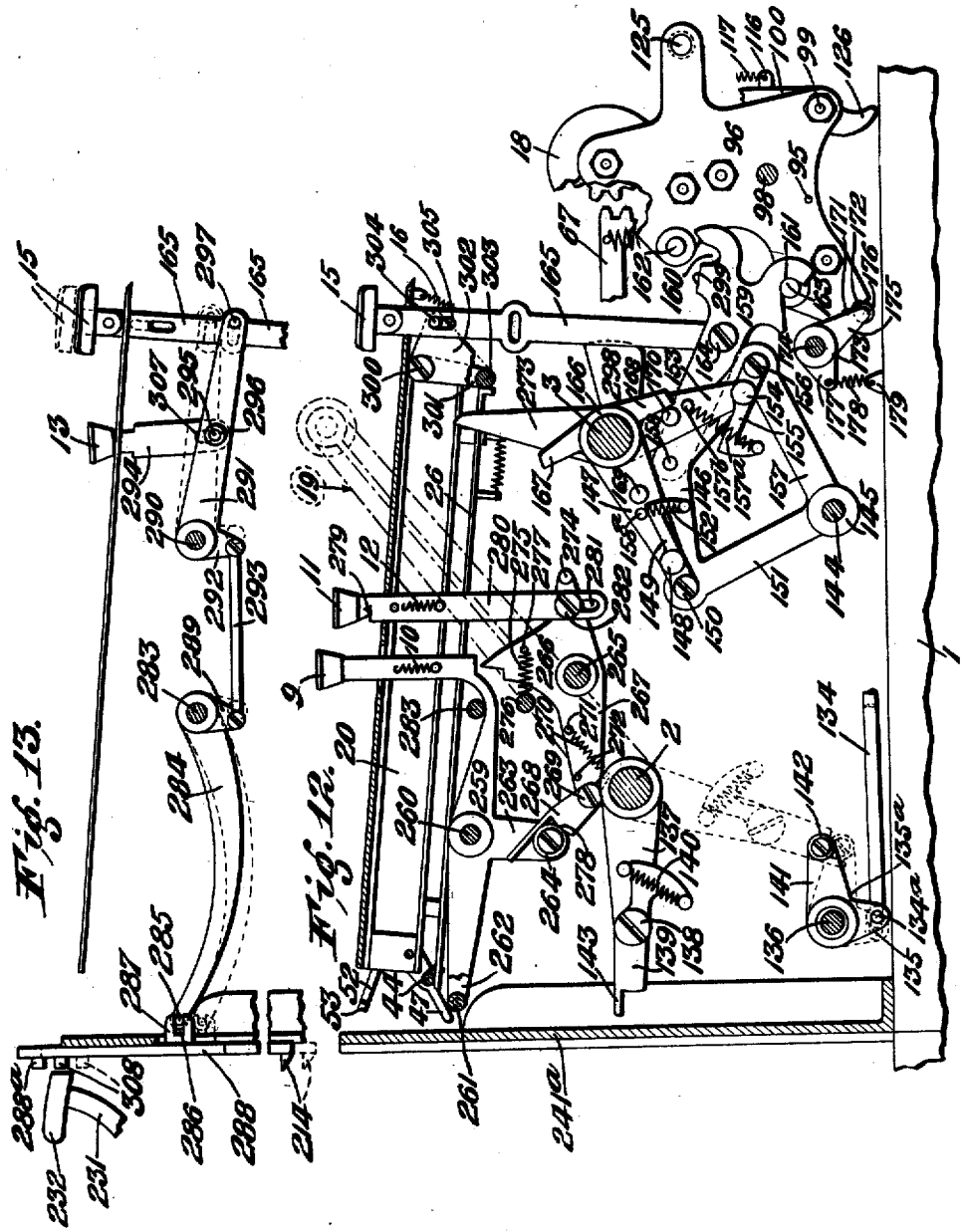
Witnesses:
G. A. Pennington
Stella Hill
Inventor:
Walter F. McCaleb,
By Bruce S. Elliott
Atty.

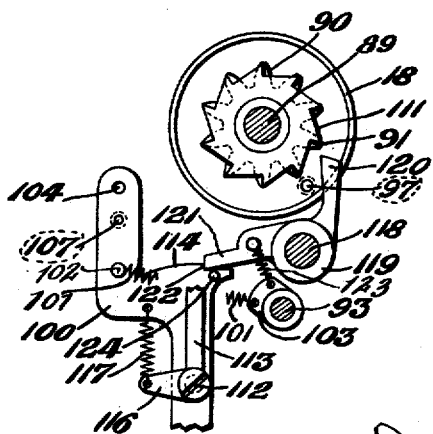
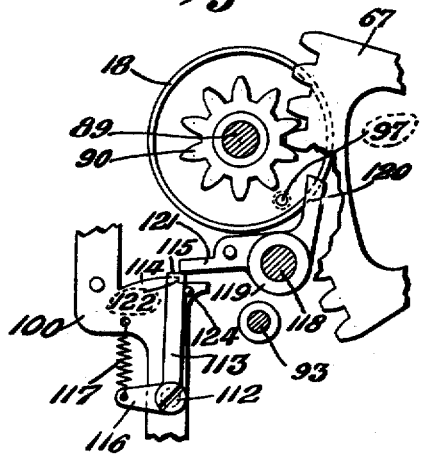
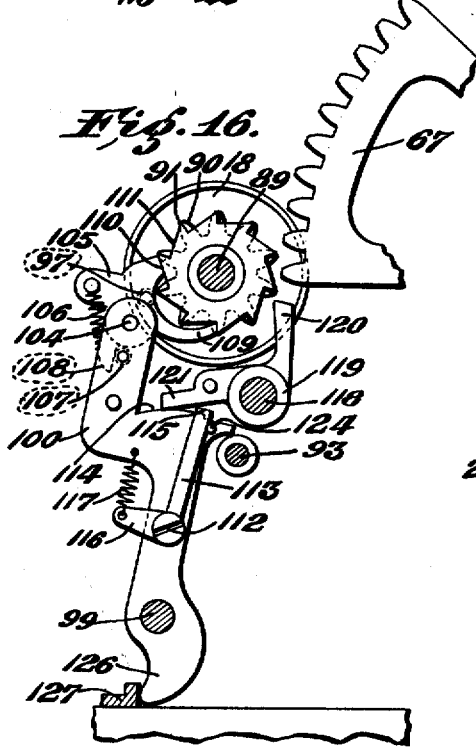
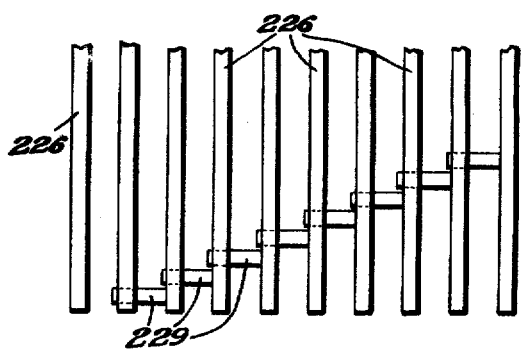

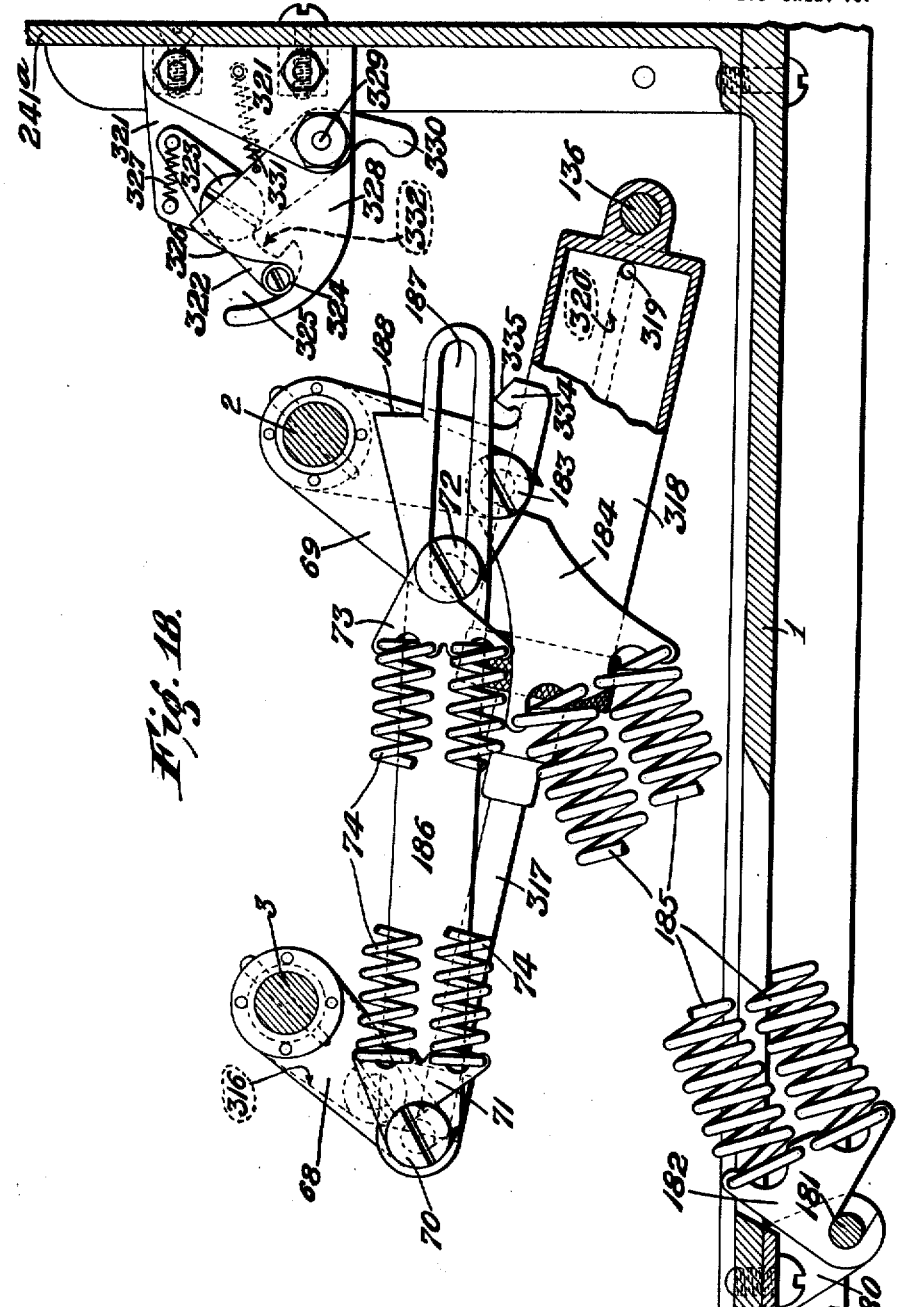

UNITED STATES PATENT OFFICE.

WALTER F. McCALEB, OF DALLAS, TEXAS.

COMBINED ADDING AND LISTING MACHINE.

1,337,844.     Specification of Letters Patent.    Patented Apr. 20, 1920.

Application filed February 1, 1915, Serial No. 5,439.   Renewed August 15, 1919. Serial No. 317,813.

*To all whom it may concern:*

Be it known that I, WALTER F. McCALEB, a citizen of the United States, residing in Dallas, in the county of Dallas and State of Texas, have invented new and useful Improvements in Combined Adding and Listing Machines, of which the following is a specification.

This invention relates to a combined adding and listing machine, and has for its general object to provide an improved machine of this character which shall be characterized by simplicity and economy of construction, and ease and rapidity of operation. Specific objects of the invention are to provide for causing the keys to act directly as stops for the adding wheel sectors; to provide novel accumulator mechanism; to provide a novel actuator for the accumulator; to provide a novel construction of sector-control bar; to provide a novel key-bar for operating, upon the depression of a key, to release the corresponding sector-control bar and simultaneously prevent any other key in the same column from being depressed; to provide novel means for restoring the accumulator to normal; to provide stop mechanism to permit the carry-overs of the accumulator to be restored before the total or sub-total key can be fully depressed, thereby permitting the total and sub-total to be printed at any time; to provide novel means for restoring the sectors to normal; to provide improved means for holding the accumulator in operative or inoperative position relative to the sectors; to provide novel means for connecting the accumulator sectors with the type sectors; to provide novel means for actuating the hammer and paper feed mechanism; to provide improved general-error key mechanism; to provide an improved construction and operation of key-bar and sector-control bar; and, finally, to provide improved mechanism to permit of the operations of elimination, totaling and sub-totaling being performed.

In addition to the above-recited objects of the invention, it may be stated that the invention likewise involves various novel constructions and combinations of parts whereby operations common to this class of machines are accomplished in an improved manner, and certain desirable functions are accomplished which I believe to be distinctly novel attributes in an adding machine.

These features of the invention can be better understood, however, from the detail description of the invention following, and will be set forth in the claims following the specification.

In the accompanying drawing—

Figure 1 is a top plan view;

Fig. 2 is a view in side elevation of the right or crank side of the machine;

Fig. 3 is a view in side elevation partly in section, the view being taken from the right-hand side of the machine, the major line of section being just inside the frame;

Fig. 4 is a view similar to figure 3, but viewed from the left-hand side of the machine;

Fig. 5 is a fragmentary longitudinal sectional view on an enlarged scale and certain of the parts being removed, the view being of the forward portion of the machine, and the parts shown being in normal position;

Fig. 6 is a view similar to Fig. 5, the view being of the rear portion of the machine;

Fig. 7 is a fragmentary sectional view taken on line 7—7 of Fig. 5, showing a portion of the key board, one key being mounted therein and one key with the coöperating parts being removed;

Fig. 8 is a schematic view on an enlarged scale showing the relation between the movement of the slide bar as it affects the movement of a sector with relation to an adding wheel gear, the purpose of the view being to illustrate that the sector will be moved a defined distance in proportion to the movement of the slide bar governing its movement;

Fig. 10 is a fragmentary plan view of the machine with the key board and certain of the interior mechanism removed, showing more particularly the adding mechanism and the sectors coöperating therewith, and with the sectors which operate the type bars, the latter being removed;

Fig. 11 is a fragmentary view, partly in side elevation and partly in section, viewed from the right-hand side of the machine, and showing the position of certain parts when a key has been depressed and the operating handle pulled forward;

Fig. 12 is a view partly in side elevation and partly in section, viewed from the left-hand side of the machine, with the parts in the same position as shown in Fig. 10, but showing the "total" key depressed to release the adding wheels from engagement with the sectors.

Figure 9:
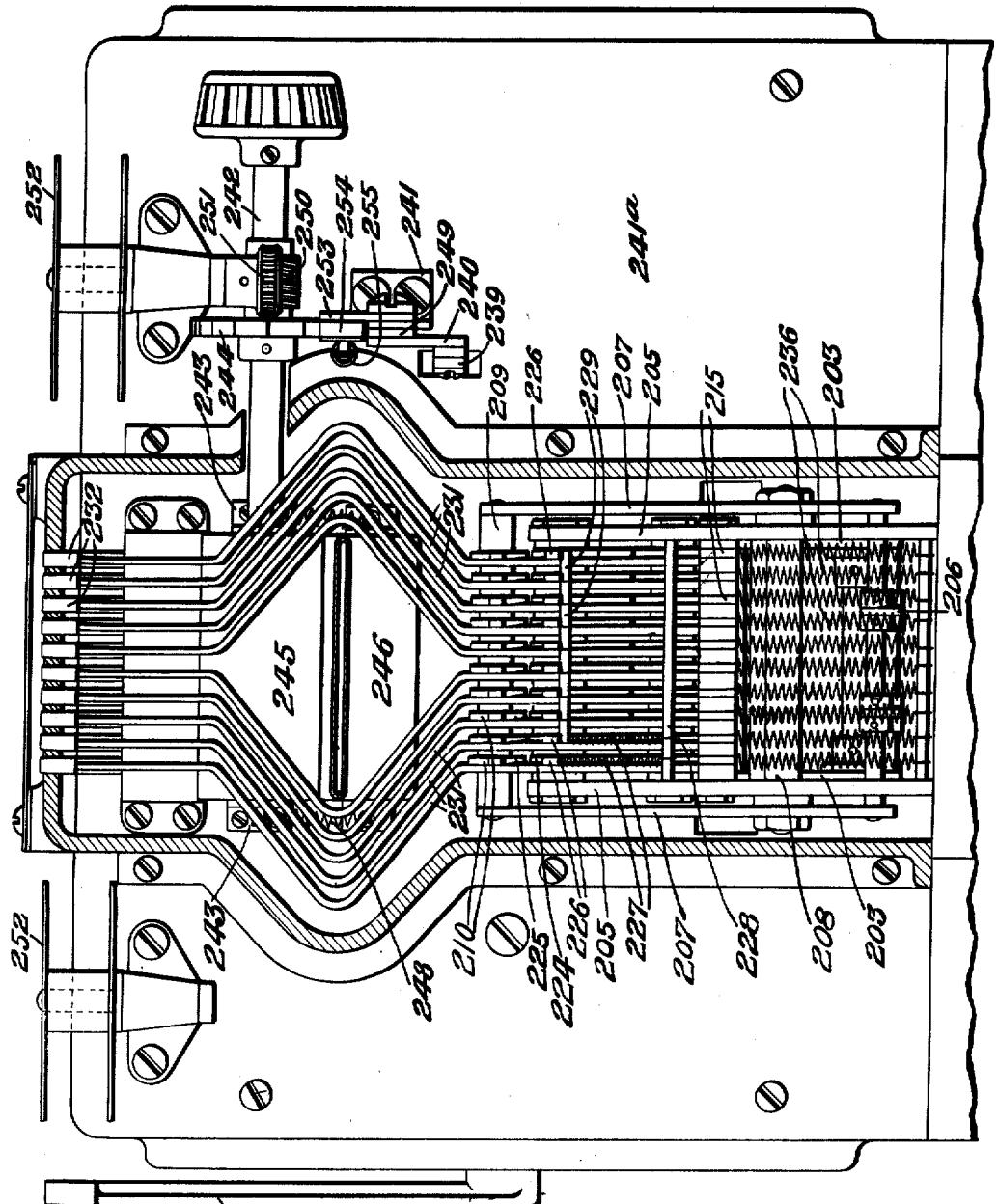
Fig. 9 is a view partly in rear elevation and partly in transverse section, illustrating more particularly the hammer mechanism and the ribbon feed and paper guide.

Fig. 13 is a fragmentary view in side elevation, showing in full lines the position of the parts actuated by the depression of the "total" key to raise the type bar carrying the "total" and "sub-total" signs, the former being in the position for printing, and showing in dotted lines the position of these parts when actuated for taking a "sub-total", or when the eliminating or "non-add" key has been depressed;

Fig. 14 is a fragmentary sectional view, taken on the line 14—14 of Fig. 10 and viewed in the direction of the arrow, showing parts of the "carry-over" mechanism in normal position;

Fig. 15 is a similar view showing one of the adding wheel gears in mesh with a sector and with the parts shown in Fig. 14 in the position they occupy when the "carry-over" mechanism has been released by a stud on one of the adding wheels;

Fig. 16 is a similar view showing the position of the parts of Figs. 14 and 15 after the sector has been restored to normal position and the adding mechanism thrown out of mesh with the sectors, and with the parts of the "carry-over" mechanism in the position they occupy after having advanced an adding wheel one digit;

Fig. 17 is a fragmentary plan view on an enlarged scale showing the hammer trippers for the printing mechanism; and Fig. 18 is a view partly in side elevation and partly in section on an enlarged scale showing mechanism for limiting the speed of a main driven shaft actuated from the crank shaft, and for controlling the speed of return of both shafts to normal position.

Referring now to these drawings, the numeral 1 indicates the base of the machine, which supports side frame members, hereinafter referred to, and in which members are journaled the crank shaft 2, the main driven shaft 3, and other shafts to be mentioned later. Mounted on the top of the frame is a key-board 4 having a standard arrangement of keys 5, each of which is controlled by a retractile spring 6. The key-board is slightly inclined downwardly and at its top is arranged a transverse row of column-control keys 7, each of which is normally held upward by a coil spring 8, there being one key 7 for each column of figures on the key-board and the purpose of these keys, as usual, being to restore any key in a column which has been erroneously depressed. At the left hand side of the machine, and as shown in Fig. 1, there is mounted in the key-board a general-error key 9 controlled by a spring 10, by actuating which key all other keys which have been depressed may be simultaneously restored to normal. Below this key is arranged a repeat key 11 controlled by a spring 12, by depressing which key certain mechanism hereinafter referred to will be actuated to prevent any keys which have been depressed from being restored to normal in the operation of the machine so that any given number may be repeatedly added and printed when desired. Below this key again is located a non-add, or eliminating key 13, controlled by a spring 14. By holding this key depressed certain mechanism to be later described is actuated to hold the adding mechanism, or accumulator, out of mesh with its actuating sectors in the operation of the machine, so that the number corresponding to the keys depressed will be printed but not added. Below the eliminating key 13 is arranged a combined total and sub-total key 15, controlled by a spring 16, by depressing and releasing which a sub- or intermediate, total can be taken at any stage in the operation of the machine, and by holding which key depressed during the operation of the machine the total of all the numbers added may be taken and the machine simultaneously cleared, that is, all of the adding wheels returned to zero.

The functions of the various keys described as being mounted on the key-board are well known to those skilled in this art, and the novel means by which these functions are accomplished in my machine will be later fully described.

Extending across the top of the machine at its lower end is a series of sight openings 17 through which appear, in a readily observable fashion, the digits from 0 to 9 arranged around the peripheries of a series of adding wheels 18. Mounted on one end of the crank-shaft 2 is a crank-handle 19. Mounted on the under side of the key-board 4 are a series of guide-frames 20 (Fig. 7) extending substantially from the upper to the lower end of the key-board in parallel relation, and being secured in position by screws 21 having nuts 22 applied to their ends. The guide-frames 20 are rectangular in shape and open at one side as shown. The stems 23 of the keys 5 extend through alining apertures 24 provided in the top and bottom of these guide-frames, and each key is provided at its lower end with an extension 25 inclined toward the front of the machine. The numerals 26 indicate key-bars, one of which is slidably mounted below and in parallel relation with each of the guide-frames 20 through the medium of slots 27 working over studs 28, the heads of which support the said key-bars. Spacing collars 29 surrounding the studs 28 serve to space the key-bars from the guide-frames, and maintain them in parallel relation thereto. The side of each guide-frame 20 is provided with a series of slots 30 in each of which may move a stud 31 mounted on the side of the key-stem 23, and to which is secured the lower end of a spring 6 controlling the key, the upper end of said spring being connected to a stud 32 secured on the outer side of the guide-frame. Each of the key-bars is provided with a line of apertures 33 having inclined end walls, these apertures corresponding in size and shape with the inclined ends 25 of the keys, and being normally in position directly over said inclined ends, (Fig. 5). Each of the studs 28 nearest the front of the machine (Fig. 5) is provided with an extension to which is secured one end of a coil spring 35, the other end of which is secured to a stud 36 mounted on the under side of the key-bar 26, the arrangement being the same for each key-bar. Any of the keys, when depressed, projects into the path of a corresponding sector bar, and coöperates with the bar to permit a movement of the bar corresponding to the number of that key. Each of the stems 23 of the keys is provided with an elongated rectangular aperture 37, the apertures of all of the keys in a column being in alinement corresponding to each column and extending through the apertures in each column of keys is a sector-bar 38 (Fig. 8), each of which is provided in its upper edge portion with a series of rectangular recesses 39, said recesses being progressively of greater length from the front to the rear ends of the bars, or from left to right, as shown in Figs. 3, 5, 8 and 11, and from right to left in Fig. 4. The stems 23 are rectangular in shape, and in normal position their slots 37 rest directly over the recesses 39 with the forward side of the keys, or that toward the left in Fig. 5, substantially flush with the corresponding walls of the recesses 39, so that on the depression of any key the top of its slot can pass down into the corresponding recess 39 of the sector-bar with the front side of the key and the front wall of the recess in sliding engagement. The keys in each column are numbered in sequence from 1 to 9 from the lower, or front end, of the key-board to the upper end. Thus, the key at the extreme left of Fig. 5 will contain the 1 digit, and the key at the extreme right of Fig. 6 will contain the 9 digit. It is obvious that when any key of a column is depressed the sector-bar of that column can be moved forward only for the distance of the space between the rear side of the key-bar and the rear wall of the recess 39 corresponding to the key depressed. The respective lengths of the recesses 39 of each sector-bar are so proportioned that this operative space in the second recess from the front end, corresponding to the digit 2, is twice that of the space of the first recess, corresponding to the digit 1; that of the third recess is three times that of the first recess; that of the fourth recess four times; and so on to the upper end (shown at the right of Fig. 3), where this space, corresponding to the digit 9, is nine times the length of the space of the first recess. These recesses control the movement of the sectors which actuate the accumulator, and a fuller statement of their function will be reserved until the parts of the mechanism coöperating with the sector-bars have been described. It will also be apparent that when a key 5 is depressed the entrance of the inclined end 25 into the similarly inclined aperture 33 of the key-bar 26 will cause such key-bar to be moved rearwardly, or toward the right in Fig. 5, against the resistance of its spring 35. Each of the key-bars 26 (Fig. 6) is provided at its upper or rear end with an aperture 40. Pivotally mounted at 41 in the upper or outer end of each of the guide-frames 20 is a spring catch 42, the same being in the form of a yoke embracing the end of the guide-frame, and the pivotal mounting being by means of the screws 41 screwed into one side member of the guide-frame and into a piece 43 (Fig. 4) spanning the open side, respectively. Extending between the two arms of the spring catch 42 is a rod 44 which normally engages in a recess 45 provided on the under side of each sector-bar 38 at the upper or outer end thereof (Fig. 6) to lock said bar from movement. Depending from the center of each of the rods 44 carried by the spring catch 42 is a locking-lug 46 which normally rests on the upper side of the key-bar 26. The side members of the spring catch 42 are extended outward for some distance beyond the rod 44 to provide lever arms 47, the purpose of which will presently appear. One side member of the spring catch 42 projects rearwardly, as shown in Fig. 6, and indicated by the numeral 48, and connected to the outer end of this projection is a coil spring 49, the upper end of which is connected to a stud 50 mounted on the side of the guide-frame 20. Pivotally mounted at 51 on the side of each guide-frame above the spring catch 42 is a dog 52 having at its outer end a right angle extension 53 projecting under the corresponding column-control key 7, and on its inner end and projecting from its under side having a cam lug 54 which normally engages with a similar lug 55 provided on the upper side of the extension 48 of the spring catch. When the key is depressed and the key bar 26 moved rearwardly as before mentioned, the spring catch will be actuated by the spring 49 to cause the locking lug 46 to enter the aperture 40 of the key bar to lock the same in its retracted position, and simultaneously with the fall of this spring catch the bar 44 will be turned out of engagement with the recess 45 in the upper end of the corresponding sector bar 38, which is then free to be moved in a manner to be later described. In the downward movement of the spring catch 42, as last above described, the dog 52 will be raised by engagement of the cam lug 55 with the cam lug 54 and be held thereby in such raised position, this position of the parts being shown in Fig. 12. Assuming that the key was erroneously actuated, the operator will press the column control key 7 of the column in which such key was depressed, whereupon the stem of said column-control key will engage the end 53 of the dog 52 and turn the same downward, and the cam lug 54 engaging the cam lug 55 will turn the outer end of the spring catch 42 upward, thereby permitting the key-bar to be retracted to normal position by its spring and again returning the rod 44 to the recess 45 of the corresponding sector-bar to lock it against movement. One or more of the keys having been depressed, the machine is then ready to be operated to perform the adding and the printing operations, and the mechanisms for performing these functions will now be described in order.

Mounted on opposite ends of the main driven shaft 3 are two similar cam-plates 56, 57, each of which is provided with a cam-groove 58. Loosely mounted on the shaft 3 are two crank-arms 59, pivotally connected, at 60, to the outer end of each of which, is one member 61 of a toggle-lever. The other member 62 of this toggle-lever is pivotally mounted at its lower end, as indicated at 63, on the side of the frame 1 (Fig. 5), and the inner ends of these toggle-levers are connected by a pivot pin 64 on which is mounted a roller 65 adapted to work in the cam-groove 58. Extending between and mounted in the outer ends of the crank-arms 59 is a bar 66, known as the "sector-return bar," which normally supports a series of sectors 67, for actuating the accumulator mechanism, said sectors being journaled at their inner ends on the shaft 3. Referring to Fig. 18, the numeral 68 indicates a crank-arm which is fixedly secured on the driven shaft 3. A corresponding member in the form of a crank-plate 69 is fixedly secured on the crank-shaft 2. The crank-arm 68 is provided at its outer end with a crank-pin 70, over which engages a clip 71. The crank-plate 69 is provided with a crank-pin 72 over which engages a clip 73. The clips 71 and 73 are connected by means of coil springs 74. Other parts shown in this view, with their functions, will be described later on. For the present purpose it is sufficient to say that when the crank-handle 19 is pulled forward the driven shaft 3 will be rocked through the medium of the spring connection 74 between the crank-plate 69 and the crank-arm 68. In this movement of the driven shaft 3 the cam-plates 56 and 57 are turned rearwardly, moving the rollers 65 in the same direction and slightly downward at the same time, which movement results in drawing the crank-arm 59 downwardly to carry the sector-return bar 66 out of contact with the bottoms of the sectors. Connected to each of the sectors at its upper end is a relatively long coil spring 75, the lower end of which is secured to the bottom frame-member of the machine. These springs will therefore operate to turn each sector 67, as far as permitted by the key operated, that is a distance corresponding to the movement of its sector-bar 38, the movement of which is in turn limited by the length of the recess 39 coöperating with the key depressed. I provide an engagement or connection between each sector bar and its corresponding sector which operates to give the sector a constant increased angular rotation for every increased movement of the bar permitted by one key over its next lower numbered adjacent key in a column. This enables the numbers on the indicating faces of the wheels at each window 17 to be equidistant, though the keys are depressed equal amounts. For this purpose, on the forward end of each of the sector-bars 38 is a downwardly-projecting arm 76 (Fig. 8), having mounted on its lower end a roller 77. Mounted on the side of each of the sectors 67 are two plates 78 and 79 which provide between them a curved groove 80 for the travel of the roller 77. The plate 79 has its inner edge, which forms one wall of the groove 80, provided with a series of curved recesses 81.

To illustrate the operation of the parts thus far described, and assuming the fourth key from the left in Fig. 5, which contains the digit 4, to have been depressed; the downward movement of the corresponding sector 67, induced by its spring 75 will, through the travel of the roller 77 in the curved groove 80, draw the sector-bar 38 toward the front of the machine, until it is stopped by the engagement of the rear wall of the recess 39 with the stem 23 of the key depressed. The stoppage of the sector-bar will likewise arrest the movement of the corresponding sector which will then be in position in the further actuation of the machine, as later described, to advance the adding wheel with which it coöperates. Journaled on the crank-shaft 2 are a series of type-sectors 82, each of which engages with a rack 83 provided on the lower end of a type-bar 84, the upper portion of which is provided with a vertical row of type-members 85 containing digits running in order from 0 to 9, from top to bottom.

An important feature of my invention resides in providing for the movement of the type-bars vertically in true right lines. To this end the back frame-member 241ª is provided on its rear face with a series of guide recesses 85ª (Fig. 10) extending vertically and in parallel relation, and in each of these recesses a type bar 84 is mounted to be moved up and down therein. By this movement I secure a correct alinement and position of the type characters in the printing operation, as the said type-bars can only move vertically in a straight path, and there is therefore no swinging or other movement of these bars which would tend by wear, or otherwise, to destroy the alinement.

The inner end of each type-sector is provided with a short crank-arm 86, and each of the sectors 67 is provided with a similar crank-arm 87. Pivotally connecting these crank-arms is a rod 88. When a sector 67 is drawn downward by its spring, the connecting-rod 88 acts to raise a type-sector 82 a distance equivalent to that of the movement of the sector 67, thereby raising a type-bar 84 to bring the digit thereon corresponding to the key depressed to the printing point. The position of the parts with a key depressed, in this instance the key containing the digit 9, and with the type-bar raised, is shown in Fig. 11.

One of the marked advantages arising from the use of the type-bars 84 is that such a type bar is very readily removed to renew or repair the type.

I will now describe the accumulator mechanism by means of which the operation of adding is performed.

Extending between the side frame-members of the accumulator, and mounted therein, is a shaft 89 on which the adding wheels 18 previously referred to are journaled. Secured on the side of each of these adding wheels is a pinion 90 which is in line with a sector 67, each of these pinions having ten teeth. Secured in turn to the side of the pinion is a ratchet-wheel 91. The numeral 92 (Fig. 5) indicates one of a series of pawls which are pivotally mounted intermediate their ends on a rod 93 extending between and mounted at its ends in the sides of the machine, said pawls having their upper ends held in yielding contact with the teeth of the pinions 90 by means of coil springs 94, connected at one end to the lower end of each pawl, and at its other end to a rod 95 extending between and mounted at its ends in the side frame-members 96 of the accumulator. It will be understood that a pawl 92 is provided for each pinion 90. Their purpose is to prevent accidental turning of the pinions. They, however, permit the pinions to be readily turned by the sectors. Projecting from one side of each adding wheel, and located near the periphery thereof, is a stud 97, which, in the rotation of the adding wheels, serves to release the carry-over mechanism to permit it to operate. The side frame-members 96, between which the accumulator mechanism, as a whole, is mounted, are fixedly secured on a cross-shaft 98 journaled at opposite ends in the frame of the machine. Extending between and fixedly secured at its ends in the side frame-members 96 near the bottom thereof, is a rod 99, on which rod are pivotally mounted a series of carry-overs 100. The movement of each of these carry-overs is controlled by a spring 101, one end of which is connected to a stud 102 on the carry-over and the other to a plate 103 loosely mounted on the rod 93. The springs 101 tend to draw the upper end of each carry-over inward or toward the adding wheels. Pivotally mounted at 104 on the upper end of each carry-over is a carry-over pawl 105 which is pivoted intermediate its ends, its rear end having one end of a coil spring 106 connected thereto, the opposite end of which is connected to the carry-over. Projecting from one side of each carry-over is a stud 107 against which engages a lug 108 on the pawl 105, the spring 106 normally holding it in this position. The other end of the carry-over pawl is provided with a finger 109 which is adapted in operation to engage one or the other of the teeth of the ratchet-wheel 91 to rotate its adding wheel, and above this finger the pawl is provided with a shoulder 110 which is adapted to engage a flat portion 111 between the teeth of the ratchet-wheel to arrest the movement of the same. Pivotally mounted at 112 on the side of each carry-over is a guard 113, the upper end of which is bent to project over a curved lateral off-set 114 provided intermediate the ends of the carry-over, the projecting portion of the guard being indicated by 115. The guard 113 has at its lower end an integral arm 116, to the outer end of which is connected one end of a coil spring 117, the upper end of which is connected to the off-set portion of the carry-over. Extending between and secured at its ends in the side frame-members 96 is a rod 118 on which are journaled a series of carry-over locks 119, one of these carry-over locks being provided for each adding wheel and its corresponding carry-over. The carry-over lock has at one side an arm 120 which projects upwardly between two adjacent adding wheels, and is adapted to be engaged by the stud 97 on one of said adding wheels to release the carry-over. Projecting laterally from the opposite side of the carry-over lock is a dog 121, the outer end of which is normally held in engagement with a shoulder 122 (see Figs. 14 and 15) on the off-set 114 of each accumulator by means of a spring 123, one end of which is secured to the dog and the other end to the plate 103 before referred to. Mounted on the carry-over near the inner end of the curved off-set 114 is a stud 124. The guard 113 normally engages the outer end of the dog 121, but when said dog is raised by a stud 97 on an adding wheel engaging the arm 120, the guard 113 springs inward against the stud 124 and under the end of the dog 121 so that the dog in the movement of the carry-over, as later described, will ride over the shoulder 122 and not engage it. The numeral 125 indicates a rod mounted at its ends in the opposite side frame-members 96, which rod acts as a stop to limit the movement of the carry-overs when they are drawn outward by the carry-over restorer, as hereinafter described. Each of the carry-overs 100 has a curved portion 126 forming a nose-piece projecting below the rod 99, and in the path of a slide-plate 127, which acts as a carry-over restorer. This slide-plate (see Figs. 3, 4, 5, 10, 11 and 16) is provided near each end with a slot 128, in which is located a roller 129 mounted on a screw 130, the head of which is large enough to extend over the slot and hold the carry-over restorer 127 in slidable relation on the bottom frame-member. The numerals 131 indicate studs located on the bottom of the machine near opposite ends of the carry-over restorer 127, and the numerals 132 similar studs located on the slide-plate near opposite ends thereof. Coil springs 133 are mounted at their opposite ends to these respective pairs of studs, and tend normally to hold the slide-plate 127 in a normal retracted position, or in that position in which it is farthest removed from the nose-pieces 126 when the latter are in normal position, such position being shown in Fig. 5.

Adjustably mounted in the studs 132 are two connecting-rods 134, each of which extends rearwardly (see Figs. 3, 4, 10 and 12) and at its outer end is connected to a rod 134ᵃ connecting corresponding members 135 of a bell-crank lever 135ᵃ which is fixedly secured on a shaft 136, said shaft extending between and being journaled in the side frame-members of the machine. Secured on the crank-shaft 2 near opposite ends thereof are two crank-arms 137, each of which has pivotally mounted on its lower end, as indicated at 138, a toggle-member 139, said toggle-member being pivoted intermediate its ends on the crank-arm. This toggle-member occupies normally an inclined or broken relation with respect to the crank-arm 137, as shown by Figs. 3 and 4. A coil spring 140 connects the upper end of the toggle-member 139 with the crank-arm 137, tending normally to straighten said toggle-member with respect to the crank-arm. The other member 141 of the bell-crank levers 135ᵃ is provided at its outer end with a stud on which is mounted a roller 142. The lower end portion of the toggle-member 139 is provided with a shouldered recess 143 which normally engages said roller, being held in such position by the spring 140. In the first movement of the crank-handle 19 the crank-arms 137 will be turned toward the rear, and in this movement the toggle-members 139 will be straightened with respect to the crank-arms 137, as shown by the dotted lines in Fig. 12, thereby turning the bell-crank lever 135ᵃ and drawing the slide-plate 127 toward the nose-pieces 126; and this movement continues until the shouldered recess 143 snaps off of the roller 142 when the springs 133 will immediately return the slide-plate to normal position.

A key (one or more) having been depressed, and its corresponding sector lowered in the manner previously described, the next main operation will be that of effecting engagement between the accumulator and the sector of the key depressed, or if more than one key has been depressed of all of the sectors so affected. To accomplish this the mechanism is employed which will now be described.

The numeral 144 (Figs. 4 and 12) indicates a stub-shaft mounted on one of the side frame-members of the machine, and on this stub-shaft is journaled a bell-crank lever 145 having the extremities of its arms connected by an integral member 146. Journaled on the driven shaft 3 is a crank-arm 147 which has pivotally mounted at 148 on its outer end a toggle-member 149, said toggle-member being pivoted on the crank-arm intermediate its ends, and its outer end in turn being pivotally connected, as indicated at 150, to the outer end of one arm 151 of the bell-crank lever 145. A coil spring 152 connects the other end of said toggle-member with the crank-arm 147, and tends normally to straighten said toggle-member with respect to the crank-arm 147. The parts just described are normally in the position shown in Fig. 4, that is to say, with the toggle broken. A crank-arm 153, similar to the crank-arm 147 is also journaled on the shaft 3, and has pivotally mounted on its outer end, as indicated at 154, a toggle-member 155, the pivotal connection being intermediate the ends of said toggle-member. The outer end of this toggle-member is pivotally connected, as indicated at 156, to the outer end of the other arm 157 of the bell-crank lever 145. A spring 157ᵃ corresponding to the spring 152 tends normally to straighten the toggle-member 155 with reference to the crank-arm 153. Such movement of the toggle-member is limited by a stud 157ᵇ on the crank-arm 153 to which one end of the spring 157ᵃ is secured. In a similar way, the straightening movement of the toggle-member 149 is arrested by a stud 158ᵃ on the crank-arm 147 to which one end of the spring 152 is secured. Pivotally connected centrally of the member 146 connecting the outer ends of the arms 151 and 157, as indicated at 158, is a lever-arm 159 which acts as the accumulator control-bar, that is to say, to draw the accumulator into mesh with the sectors and to move it out of mesh at the appropriate times. The free end of the arm 159 is enlarged as shown, and is provided with a recess 160 on its upper side and a recess 161 on its under side. Projecting from one of the side frame members 96 of the accumulator is a stud 162 located toward the upper part of the frame, and the recess 160 on the upper side of the accumulator control-bar 159 normally engages this stud. Toward the bottom of the same side frame-member of the accumulator is a similar stud 163, which is adapted to be engaged by the recess 161 of the bar 159 when the same is moved downwardly, as later described. Pivotally connected at 164 to the accumulator control-bar 159 is the lower end of a relatively long stem 165 which is the stem of the total key 15, and which, through the medium of the spring 16 previously described, holds the recess 160 of the accumulator control-bar normally in engagement with the stud 162 of the accumulator. Fixedly secured on the driven shaft 3 is a double dog 166 having arms 167 and 168 projecting on opposite sides of the shaft 3. Mounted on the crank-arm 147 is a stud 169 with which the dog 167 normally engages. A similar stud 170 is provided on the crank-arm 153. As the crank-handle is drawn forward the first action which occurs is the movement forward and return of the slide-plate 127 as previously described. As the forward movement of the crank-handle continues the dog 168 will engage the stud 170 on the crank-arm 153, and by moving said crank-arm inward break the toggle-joint and move the toggle-member 155 downward against the resistance of its spring 157ᵃ. This movement of the crank-arm 153 causes the bell-crank 145 to be rocked to the left, or rear, in Fig. 4, thereby drawing the accumulator control-bar 159 in the same direction and pulling the accumulator rearwardly until its pinions engage with the sectors which have been drawn down. As this engagement is effected the toggle-member 149 will have assumed a straight position with reference to the crank-arm 147, (shown in Fig. 12, but in connection with a different position of the control-bar 159 from that above described) and thereby serves to temporarily lock the accumulator in mesh with the sectors. The lower inner side of one of the frame-members 96 of the accumulator is provided with two semi-circular recesses, an upper one 171 and a lower one 172, and a further yielding locking means for the accumulator is provided by a bell-crank 173 which is journaled on a stub-shaft 174, mounted on the side of the machine, one arm 175 of which is provided at its outer end with a roller 176, and the outer end of the other arm 177 being connected to one end of a coil spring 178, the other end of which is connected to a lug 179 on the bottom of the machine. The spring 178 holds the roller 176 in yielding contact with the frame-member 96 so that said roller will yieldingly engage in one or the other of the recesses 171, 172, according to whether the accumulator is moved into or out of mesh with the sectors. The purpose of this yielding locking mechanism is to maintain the accumulator in the position to which it may have been moved by the accumulator control-bar 159 at such times as said bar may be moved out of engagement with one or the other of the studs 162 and 163. Accordingly, as the accumulator is moved into mesh with the sectors, as above described, the roller 176 will move into the upper recess 171, and the parts of the machine will then be in the position shown in Fig. 11, which illustrates the key with the 9 digit thereon depressed, and the crank-handle drawn forward.

Referring again to Fig. 18, the numeral 180 indicates a depending bracket secured to the base of the machine and provided with a stud 181 over which engages a clip 182. The crank-plate 69 is provided with a similar stud 183 over which engages a clip 184. A pair of coil springs 185 connect the two clips 182 and 184. As the crank-handle 19 was drawn forward as above described, the crank-plate 69 was thereby moved rearwardly against the resistance of the springs 185. The return movement of the crank-handle is therefore effected by the pull of these springs. In this latter movement of the crank-handle motion is imparted to the driven shaft 3 through the medium of a connecting-bar 186, one end of which is pivotally connected to the stud 70 on the crank-arm 68, previously referred to, and the other end of which is provided with an elongated slot 187 in which the stud 72 works. The said connecting-bar 186 is also provided at its rear end and at its upper side with a shoulder 188, the purpose of which will be later described. It will be seen that as the crank-plate 69 moves forwardly under the pull of the springs 185 the stud 72, which is normally in engagement with the inner end of the slot 187, will operate to push the crank-arm 68 forwardly and thereby turn the driven shaft 3. As the driven shaft 3 is thus turned the cam-plates 56, 57, will be rocked forwardly and the cam-groove 58 will act on the roller 65 to move the lever 62 from the position shown in Fig. 11 to that shown in Fig. 5, thereby raising the inner end of the toggle member 61 and forcing the crank-arms 59 carrying the bar 66 upward, which bar engages the under side of the sectors which have been drawn downwardly and raises and restores them to their normal position; and in this movement of the sectors 67 the pinions 90 in mesh therewith will be rotated to advance the digits on the adding wheels 18 a distance corresponding to that to which the sectors have been depressed. In the continued movement of the driven shaft 3, and after the sectors have been restored in the manner just described, the dog 167 (Fig. 4) will engage the stud 169 and break the toggle 147, 149 at 148, and thereby move the bell-crank 145 with the accumulator control-bar 159 toward the front of the machine, which latter bar, through engagement with the stud 162 of the accumulator, acts to move the pinions 90 out of mesh with the sectors 67. At the completion of this movement the toggle member 155 straightens and engages the stud 157$^b$, and thereby locks the accumulator in the outward, or inoperative, position. In the preceding operation, where the adding wheels have been turned by the rise of the sectors, if a digit has been depressed in a column which, added to the digit on the adding wheel of that column appearing through the sight opening 17, will amount to more than nine, the stud 97 on such adding wheel will engage the arm 120 of the carry-over lock 119, and raise the dog 121 so that the guard 113 will spring inward against the lug 124 to carry its end 115 under said dog. This occurs while the sectors are moving upward and while in mesh with the pinions of the accumulator, as shown in Fig. 15. As the sectors are restored to normal, the carry-overs are prevented from being drawn inward by their springs 101, by reason of the fact, as shown by Fig. 11, that the nose-pieces 126 of the accumulators are in engagement with the forward edge of the slide-plate 127. After the sectors have been fully raised, however, the accumulator frame will then be rocked outward by means of the accumulator control-bar 159, in the manner previously described. In this rocking movement of the accumulator the nose-pieces 126 will be turned out of engagement with the slide-plate 127, and the carry-overs, released by the carry-over locks 119, in the manner described, will be drawn inward by their springs 101. In this movement of the carry-overs the finger 109 of the carry-over dog will engage a tooth of the ratchet-wheel 91 of the adjacent adding wheel, and thereby advance said adding wheel one digit, such inward position of the carry-over with the carry-over dog in the locking position being shown in Fig. 16. Such carry-overs as will thus have been permitted to move inward will now have their nose-pieces 126 in engagement with the forward edge of the slide-plate 127, as shown also in Fig. 16. In the next forward movement of the crank-handle the slide-plate 127 will be drawn rearward and then released in the manner heretofore described, in its rearward movement turning the carry-overs outward a sufficient distance to permit the dog 121 of the carry-over lock 119 to fall behind the end 115 of the guard 113, and in front of the shoulder 122, and as the slide-plate snaps back to normal position the springs 101 of the carry-overs will then draw them slightly toward the adding wheels so that the dogs 121 will again engage the shoulders 122 of the carry-overs.

The manner of operating and restoring the sectors and controlling the downward movement of the same from the sector-bars 38 having been described, the description of the schematic view shown in Fig. 8 can now be more clearly understood. It will be observed that the sector-bar 38 occupies an inclined position relative to the horizontal. The sector and the sector-bar being in the zero, or normal position, the inclined dotted line $a—a$ is drawn through the center of the stud 77 and parallel with the sector-bar. This line will necessarily cross the line $b—b$, which is a true horizontal drawn through the center of the shaft 3 and the center of the adding wheel shaft 89. As the sector turns on the center $c$ of shaft 3, an arc $d$ struck from the center $c$ and passing through the point of intersection of the lines $a—a$ and $b—b$, establishes an arbitrary position for the center $e$ of the roller 77. From the point $e$ as a center the curve of the first recess 81 is determined, which recess is indicated by 81$^a$, and in this recess the roller 77 engages in its zero position. Beginning with the first recess 39, in the sector-bar corresponding to the digit 1, when key 1 is depressed the sector-bar is to move in operation a distance equal to the space between the rear side of the key-stem and the rear wall of said recess. In order to establish the position of the second curve 81, indicated by 81$^b$, the center for striking this curve is found by striking the line $f$ at an angle to a line $g$, drawn from the center $c$ through the center of the second tooth $h$ of the sector, equal to the angle between the lines $a—a$ and $b—b$, and intersecting the arc $d$ at the point of intersection therewith of the line $g$. If now, from the center $c$, an arc is drawn with a radius increased over that of the radius of the arc $d$ by the distance between the rear side of the key stem and the rear wall of the first recess 39, the point of intersection of this arc with the line *f*, indicated by *i*, will give a center for striking the said second curve 81ᵇ. In a similar manner the centers for striking the curves for the other recesses 81 are established, so that when any key of a column is depressed the movement of the sector will draw the sector-bar forward until it is stopped by the stem of the key, this stopping of the sector bar will arrest the further movement of the sector, the roller 77 will rest in the corresponding recess 81, and the tooth on the sector, corresponding to the digit depressed, will be in position to engage a corresponding tooth on the pinion 90.

Owing to the necessity of the roller 77 rolling over the edges of the recess 81, the inner edge of the bar 78 is at such a distance from the apexes of these curves as to permit such movement. At its lower end, however, the upper edge of the plate 78 extends inward on a sharper curve to provide, as it were, a projection 187ª, which in the last stage of movement of the sector as it is restored, engages the roller 77 and positively forces the sector-bar 38 to its extreme rearmost position so that the locking-rod 44 may enter the recess 45 on the rear end of the sector-bar and lock it in its fully retracted or normal position.

The dotted lines *j—j*, are struck from the center *c* at an angle to each other equal to that between the lines *g—g*. The first line *j* passes through the center of the pivot connecting the arm 87 with the connecting rod 88, and the successive positions of this center as the arm 87 is moved by the sector are indicated at *k* on the various lines *j*.

It will now be obvious that the sector-bars 38 must move in true inclined paths. To assure this, I provide at the front end of each sector-bar an upward projection 188ª, the top of which is flat and slides on the under side of the key-board 4; and toward the lower end of the curved arm 76 I provide a rearwardly extending guide-bar 189, the lower edge of which engages in a groove 190 formed in a hub 191 of each sector.

I will next describe the mechanism by which the printing or listing is accomplished:

The numerals 192 indicate side frame-members, a portion of one of which is shown in Figs. 5 and 6, extending between and journaled in which is a shaft 193. Fixedly secured at its upper end on one end of the shaft 193 is a curved cam-arm 194 (Figs. 3 and 11) provided at its upper end with a nose-piece 195 facing the curved portion of the cam. A clearance space 196 is provided between the nose-piece and the curved surface of the cam for a purpose to be presently described. Projecting from the outer side of the cam-plate 56 near the back edge and toward the bottom thereof is a stud carrying a roller 197, which normally rests upon the outer end of the cam-arm 194. The curved or cam-surface of the arm 194 is indicated by the numeral 198. Fixedly secured on the shaft 193 are two crank-arms 199, (Figs. 5 and 11) to each of which is pivotally connected at 200 one end of a connecting-rod 201, the other end of the rods 201 being journaled to the outer ends of a shaft 202 (Fig. 6) which, in turn, is mounted in the outer ends of two lever-arms 203 fixedly secured intermediate their ends on a rod 204, extending between and journaled in the side frame-members 205 supporting the hammer mechanism now to be described.

To the lower end of each of the lever-arms 203 there is pivotally connected one end of a link 206, the opposite end of which is pivotally connected to the lower end of a lever-arm 207, said lever-arms being mounted intermediate their ends on a rock-shaft 208. Extending between and journaled in the upper ends of the lever-arms 207 is a rock-shaft 209, pivotally mounted on which is a series of dogs 210, to each of which is connected one end of a coil spring 211, the other end of which is connected to a rod 212, extending between and secured at its ends in the respective lever-arms 207. Projecting from the inner end of each dog 210 is an arm 213. The rear side of each of the type-bars 84 is provided with a lug 214, each of which engages an arm 213 and holds its dog 210 in a normal elevated position. The numeral 215 indicates what I term the "hammer actuator," which is in the form of an arm journaled at its outer end on a shaft 216, secured at its opposite ends in the side frames 205 and enlarged at its inner end to provide a head 217. This head is provided on its under side with a shoulder 218, and beyond said shoulder with an upwardly inclined nose-piece 219. The head 217 has an upward extension provided with a catch-member 220 which is normally engaged by a similar catch-member 221 provided on what I term a "tripper" 222. This tripper is journaled on a cross-shaft 223 mounted in the side frame-members 205 and provided on its upper side with an inclined shoulder 224. The under side of the dog 210, which acts as an actuator for the tripper, is provided with a similar inclined shoulder 225. It will be understood that there will be as many hammer actuators and trippers as there are hammers to be actuated, and that the description of one unit of this mechanism will apply to all of the hammer trippers and actuators. Each of the trippers 222 is provided with a rearwardly-extending arm 226 (see also Fig. 17) to the outer ends of two of which are secured the ends of two coil springs 227, the lower ends of which are connected to a rod 228 extending between the side frames 205. Referring to Fig. 17, the first arm 226 at the left is for controlling the action of the hammer which prints the total and sub-total signs. The next two arms are for controlling the hammers of the cents columns, and the remaining arms are for controlling the hammers of the respective dollars columns. Beginning to the right of the second arm, each arm 226 in order is provided on one side with a laterally-projecting finger 229 which projects under the adjacent arm 226, so that as each arm, except the first two at the left of Fig. 17, is raised, it will raise one or more arms to the left, until when the last arm to the right of Fig. 17 is raised all of the arms 226, except the first, will be raised by the engagement of each finger with an adjacent arm 226. The numeral 230 indicates a cross-shaft which is mounted at its ends in the two side frames 205, and on this shaft is journaled a series of hammers 231, one hammer being provided for each type-bar. Each hammer is provided at its outer end with a hammer-head 232 with its operative face so inclined that it will strike flush against the type-members of its type-bar. At its lower end each of these hammers is provided with a crank-extension 233 extending forwardly of the shaft 230 and provided with a large recess 234 in which engages a stud 235 secured on the adjacent hammer actuator 215. When in normal position all of the hammer actuators lie with their shoulders 218 above the rod 202 heretofore described, and are held in such position by engagement of the catches 220 and 221.

In operation a key (one or more) having been depressed the type-sector 82 will raise the corresponding type-bar 84, thereby raising the lug 214 on the type-bar from engagement with the arm 213, and permitting the dog 210 to be drawn downward by its spring 211 to bring the inclined shoulder 225 into position to engage the inclined shoulder 224 on the tripper 222. As the crank-handle 19 is pulled forward the roller 197 on the crank-plate 56 will be turned upward and out of engagement with the curved surface 198 of the cam-arm 194 until such roller engages the nose-piece 195 of such cam-arm. This acts to raise the cam-arm and rock the shaft 193, drawing the connecting-rod 201 forward and pulling the rod 202 from beneath the shoulders 218 of the hammer actuators. In this same movement the link 206 connected to the bottom of the lever-arms 203 will force the bottom end of the lever-arms 207 outward and their upper end inward or toward the type-bars, so that in this movement, by engagement of the shoulder 225 with the shoulder 224, the tripper 222 will be rocked until its catch 221 is turned out of engagement with the catch 220, whereby each hammer actuator so released will be at once drawn down by a coil spring 236 against a stop-bar 237 secured at its ends to the side members 205. In this movement of the hammer actuators each stud 235 on a released hammer actuator, will engage the bottom of the recess 234 of the crank-extension 233 and throw the hammer head 232 inward to effect the printing operation. By reason of the enlargement of the slot 234 after the hammer head has struck it will be permitted to slightly rebound. This prevents a prolonged contact of the ribbon with the paper, which tends to blur the impression of the type. The printing operation just described occurs after the sectors 67, which have been affected by the depression of the keys, have been turned to their respective lowermost positions, and the type-sectors 82 to the corresponding uppermost position, and both sets of sectors are at rest. In the foregoing operation, and referring to Figs. 1 and 17, if a single key to the left of the first column of numbers is depressed, all of the arms 226 to the right of the hammer actuator released by the movement of the type-bar of such depressed key, will be raised by the fingers 229 to trip the other hammer-actuators to print all zeros; or, if keys in other columns have been depressed, to print zeros from all intermediate type-bars to the right which have not been raised. The actuation of the hammer mechanism above described is effected during the forward movement of the crank-handle. As the latter is returned to normal position the roller 197 will now engage the cam-surface 198 and rock the crank-arm 194, thereby rocking the shaft 193 in the reverse direction to that first described, moving the rod 202 into contact with the nose-piece 219 of the hammer actuators and raising all of the hammer actuators, or such as have been actuated, to normal position. In this movement the upper ends of the lever-arms 207 will be drawn rearwardly, permitting the arms 226 of the trippers to be drawn downward by the spring 227, which, of course, through the medium of the fingers 229, will serve to draw down all of the arms 226 which may have been raised in the manner described, and again bring the catches 221 in position under the catches 220. The type-bars 84 which may have been raised are now lowered by their sectors 82, and the lugs 214 engaging the fingers 213 again lift the tripper-actuators 210 to the elevated or normal position shown in Fig. 6. As the hammer-actuators are raised by the hammer actuator restorer 202 the studs 235 engage the upper wall of the recess 234 and throw the hammers outward, as also shown in Fig. 6.

The paper and ribbon feed is actuated from a crank-arm 238 fast on and projecting above the shaft 193 to the outer end of which is pivotally connected one end of a rod 239 (see Figs 4, 9 and 11). The outer end of this rod is pivotally connected to one member of a bell-crank lever 240 pivotally mounted on brackets 241 on a rear frame-member 241ª of the machine. The numeral 242 indicates a shaft journaled in brackets 243 on said rear frame-member, and on which is secured a ratchet-wheel 244. Mounted on the shaft 242 is a feed-roller 245, and below this roller is a second or friction-roller 246 mounted in a swinging bracket 247 which is normally drawn upward to hold the roller 246 in contact with the roller 245 by coil springs 248. A spring-actuated dog 249 is pivotally mounted on the other member of the bell-crank lever 240 and is adapted to coöperate with the ratchet-wheel 244. The shaft 242 is also provided with a worm 250 which meshes with a worm-gear 251 mounted on the axle of one of the ribbon-wheels 252. A pivotally mounted arm 253 has journaled in its outer end a roller 254 which is normally held by the spring 255, controlling the pawl 249, in normal engagement with the teeth of the ratchet-wheel 244 to prevent accidental turning thereof. In the forward movement of the crank-handle the connecting rod 239 will be moved rearwardly by the crank-arm 238, thereby rocking the bell-crank 240 and lowering the spring pawl 249, so that its end will spring into contact with one of the teeth of the ratchet-wheel 244. In the return movement of the crank-handle the connecting rod 239 will be pulled forwardly thereby reversing the movement of the bell-crank 240 and raising the pawl to turn the ratchet wheel 244, which thereupon rotates the shaft 242 and the feed-roller 245 to feed upward the strip of paper which in operation is fed between the rollers 245 and 246 from a supply-roll 256 (Fig. 6) mounted in brackets 257 on the rear end of the machine, the paper passing through a guide 258, as shown in Fig. 3. The guide 258 projects inward across the plane occupied by the hammers, and to provide for this arrangement the hammers 231 (see Fig. 9) are bent laterally on each side of the guide 258, to encircle the said guide in parallel relation with each other. As the shaft 242 is turned by the ratchet-wheel its worm actuates the worm-gear 251 to feed the type-ribbon crosswise of the machine in the usual manner.

I will now describe in order the operations involved in the use of the general-error key, the repeat-key, the eliminating or non-add key, and the combined total or sub-total key.

Referring to Figs. 4 and 12, the stem of the general-error key 9 is provided with a rearwardly-extending lever-arm 259 which is fixedly secured intermediate its ends on a shaft 260 journaled at its end in the side frame-members of the machine. This lever-arm extends below and is normally in contact with a rock-shaft 283, later referred to, which thereby acts to limit the upward movement of the key 9. In the outer end of the lever-arm 259 there is journaled one end of a rod 261, the other end of which is journaled in the outer end of a bracket-arm 262, the other end of which is fixedly secured to the shaft 260. The connection of the bracket-arm 262 with the shaft 260 is not shown, but it will be understood that this arm is the same as the lever-arm 259, except that it does not extend forwardly of the shaft 260. As thus far described, it will be seen that if any one or more keys have been depressed and it is desired to restore them to normal, if the error key 9 is depressed the rod 261 will be raised by the lever-arm 259 into engagement with the arms 47 of the spring catches 42, thereby raising said spring catches and releasing the key-bars in the manner previously described. Formed integral with the lever-arm 259, and extending downward therefrom, is a crank-arm 263 having mounted on a stud at its outer end a roller 264. The numeral 265 indicates a stub-shaft mounted on one of the side frame-members, on which is pivotally mounted intermediate its ends a plate 266. Extending rearwardly from this plate is an arm 267 which has pivotally mounted on its outer end a dog 268, the dog being pivoted intermediate its ends on a screw 269, and its rear end having connected to it one end of a coil spring 270, the other end of which is connected to a stud 271 on the arm 267. The spring 270 normally holds the dog 268 in a straight line with reference to the arm 267, its rear end being held by the spring 270 against a stud 272 on the arm for this purpose. The numeral 273 indicates a crank-arm which is fast on the driven shaft 3. Mounted on the forward end of the plate 266 and at the bottom thereof is a stud 274 which is normally held in engagement with the under side of the crank-arm 273 by a coil spring 275, one end of which is connected to a stud 276 on the frame, and the other to a stud 277 on the plate 266. In the operation of the parts as thus far described, when the crank-shaft 3 is turned by pulling the crank-handle 19 forward, the crank-arm 273 is raised out of contact with the lug 274, and the spring 275 draws the upper end of the plate 266 beneath the stem of the general-error key 9, the plate 266 thus acting as a lock-plate to prevent depression of the said error key after the machine has been placed in operation. In this movement of the lock-plate 266 its arm 267 will be drawn downward, thereby breaking the straight line of the dog 268 with the arm 267, the inner end of said dog being depressed, and a shouldered recess 278 formed at the outer end thereof engaging over the roller 264. The position of the parts last described is shown in Fig. 12. The parts remain in this position until the crank-handle is returned to normal position, in which latter movement the crank-arm 273 will again engage the stud 274 and turn the plate 266 downward, thereby tending to again straighten the dog 268 with reference to the crank-arm 267, which will result in the shoulder 278 pushing the roller 264 and its crank-arm outward, and thereby raising the outer end of the lever-arm 259 and the rod 261, and restoring all of the keys which have been depressed to normal. At the completion of this movement the dog 268 will spring off of the roller 264 and assume its normal position, the outer end of the lever-arm 259 will be drawn downward by the spring 10 pulling its forward portion upward into contact with the shaft 283, while at the same time the upper end of the plate 266 will have been moved from beneath the stem of the general-error key 9, all as shown in Fig. 4.

In order to repeat the adding and printing of any given number, or series of numbers, the repeat-key 11 is depressed, and by means of a notch 279 in its stem engaging with the key-board 4, it may be held in such depressed position until again released, when its spring 12 will raise it. This repeat-key has a relatively long stem 280, the lower end of which is provided with a slot 281 which works over the stem of a screw 282 mounted on the lock-plate 266. By depressing this key the top of the slot 281 will be moved downward into engagement with the screw 282 so that in the operation of the machine when the crank-arm 273 is turned out of engagement with the stud 274 the plate 266 cannot be drawn upward by its spring, and hence the dog 268 will not be brought into engagement with the roller 264 of the general-error-key lever 259. It follows, therefore, that the keys which have been depressed will not be restored when the crank-handle returns to normal position, and the continued operation of the crank-handle will continue to add and print the digits corresponding to the keys thus held in the depressed position by their keybars.

The mechanism affected by depressing the eliminating or non-add key indicated by 13, and the functions performed thereby, will now be described.

The numeral 283 (Fig. 13) indicates a rock-shaft journaled on the frame of the machine, projecting rearwardly from which, and fixedly secured at one end thereto, is a lever-arm 284. In the outer end of this lever-arm there is a stud 285 which engages in a slot 286 (see Fig. 6) of a lug 287 which is secured on the rear side of the type-bar 288 carrying the total and sub-total signs; the sub-total sign 288ª being adapted to be printed when the eliminating-key is depressed. Fast on the rock-shaft 283 is a short crank-arm 289. The numeral 290 indicates a second rock-shaft similar to that indicated by 283, secured to which is one end of a lever 291. This lever is provided below the shaft 290 with a short crank-arm 292, and a link 293 is pivotally connected at its ends to this crank-arm and the crank-arm 289, respectively. The lever 291 is pivotally connected at 295 centrally of its length to the lower end of the stem 294 of the key 13, and on the pivot 295 is mounted a stop 296 for a purpose to be presently described. The forward end of the lever 291 is pivotally connected at 297 to the stem 165 of the total-key 15, the lower end of this stem being connected to the accumulator control-bar 159, as previously described. On depressing the eliminating key 13 the shaft 283, through the cranks and connections described, will be rocked to raise the type-bar 288 to bring the sub-total sign 288ª to the printing point, the position of the parts when the key 13 has been pressed being indicated by the dotted lines in Fig. 13. In depressing the key 13 the stem 165 will also be depressed, thereby moving the recess 160 of the accumulator control-bar out of engagement with the stud 162, but not far enough for the recess 161 to engage the stud 163. In the raising of the type-bar 288 the hammer mechanism will be released by the raising of the lug 214 on the type-bar from engagement with the tripper-actuator, and in the operation of the machine the hammer cooperating with the type-bar, will print the eliminating sign. With the key 13 held depressed, and with the keys depressed corresponding to the number to be printed, but eliminated or not added, the crank-handle is pulled forward and released as in the ordinary operation; but in this case the accumulator will not be drawn into mesh with the sectors 67, and hence, while the printing or listing operation will occur, the number thus printed will not be added. During this operation the accumulator will be held in its inoperative position by means of the bell-crank 173 and roller 176 engaging in the recess 172, as previously described.

The operation of obtaining a sub-total is effected in the following manner:

Fixedly secured on the driven shaft 3 is a stop plate 298 (Fig. 4) which projects upwardly from the shaft, its upper end being immediately under, but at a slight distance from, the stop 296 on the lever 291, the distance being sufficient to permit the eliminating-key to be operated without engagement of the stud 296 with the stop-plate 298. This stop-plate 298, however, prevents the key 15 from being fully depressed to bring the recess 161 of the accumulator control-bar into engagement with the stud 163, which in operation will throw the accumulator in mesh with the sectors, until, through the action of the dog 139 and bell-crank 135ª, as previously described, the slide-plate 127 has been actuated to restore the carry-overs to normal. When the driven shaft, however, has been turned in the manner previously described a sufficient distance to carry the stop-plate from beneath the stop 296, the key 15 is depressed to bring the recess 161 into contact with the stud 163, to depress stud 163 and thereby rock the accumulator as a whole on the shaft 98 to bring its pinions into mesh with the sectors 67. The key 15 is then released, and a stop-portion 299 on the top of the accumulator control-bar adjacent to the recess 160 will engage the under side of the stud 162. In the movement of the accumulator the upper recess 171 will have been turned into engagement with the roller 176 which will act to hold the accumulator in its engaging position. This contact of the stop-surface 299 with the stud 162 holds the lever 291, and, through the mechanism described, the type-bar 288, in the same positions as they would be held by the depression of the eliminating-key 13, or in the position shown by the dotted lines in Fig. 13. On depressing the key 15 for the sub-total or total operations, certain mechanism is operated, the description of which, for the sake of clearness, has been reserved to this time. Extending transversely through, and journaled in the guide-frames 20, (see Figs. 5, 11 and 12) is a rock-shaft 300 on one end of which is secured a crank-arm 301. On the other end of this rock-shaft is secured a crank-plate 302, and extending between and secured at opposite ends to the outer ends of the crank-arm 301 and the crank-plate 302 is a rod 303 which extends across, and is normally in contact with, the forward ends of all of the key-bars 26. Mounted in the crank-plate 302 is a stud 304 which engages in a slot 305 in the stem 165 of the total-key 15. When the key 15 (see Fig. 12) is depressed for the purpose of the sub-total or total operations, the top of the slot 305 will engage the stud 304 and rock the crank-arm 301 and crank-plate 302, thereby forcing the rod 303 rearwardly against the ends of the key-bars 26 and moving them backward to carry all of the apertures 33 out of alinement with the bent ends 25 to prevent any of the keys from being depressed. In this operation the apertures 40 in the key-bars will be moved to a position beneath the locking-lugs 46 which will thereupon spring downward into said apertures and lock the key-bars in inoperative position. At the same time the rods 44 will be carried out of engagement with the recess 45 of the sector-bars to permit of the movement of these bars when the crank is turned to operate the machine. As the crank is now turned, the parts being in the position described, the adding wheels will be rotated by engagement of the sectors 67 with their pinions, the sectors, of course, being pulled down by the springs 75, and the rotation of the adding wheels continues until the studs 97 thereon come in contact with the upper ends of the arms 120 of the carry-over locks 119, when the further motion of the adding wheels and also of the sectors will be arrested. The adding wheels will then all stand at zero. In this movement, the type-bars will be raised a distance corresponding to the distance the various sectors descend before their motion is arrested in the manner stated, and the printing operation occurs in the manner previously stated. The amount then printed would be the sub-total indicated by the machine at that time. Immediately after the operation of printing, the dog 168 will engage the lug 170 (see Fig. 4) of the crank-arm 153, and by rocking the bell-crank 145 rearwardly, as previously described, will draw the stop-portion 299 from under the stud 162, whereupon the spring 16 on the total-key stem 165 will act to draw the accumulator control-bar 159 upward to bring the recess 160 in engagement with the stud 162. Time for this movement is permitted by the provision of the recess 196 in the cam-arm 194 into which the roller 197 of the cam-plate 156 rides after engagement with the nose-piece 195 to effect the printing operation, without thereby further moving the cam-arm 194. On the return movement of the crank-handle the sectors 67 are raised by the mechanism previously described, and while still in contact with the pinion of the adding wheels, thereby restoring the adding wheels to the position they occupied at the beginning of the operation. Just before the end of the rear stroke of the crank-handle the spring catches 42 will be raised to release the key-bars and lock the sector-bars in the manner previously described. In this final movement the dog 167 will engage the stud 169 of the crank-arm 147, and by rocking the bell-crank lever 145 will throw the accumulator control-bar 159 forward and thereby move the accumulator to carry the pinions out of mesh with the sectors. In this movement the groove 172 will move into engagement with the roller 176 to lock the accumulator in its retracted position.

The operation of securing a total is substantially the same as that just described, except that the key 15 is held depressed to maintain the recess 161 in engagement with the stud 163 so that after the descent of the sectors has turned the adding wheels to zero in the manner previously described, the engagement of the dog 168 with the lug 170, instead of acting as in the ordinary operation previously described, to turn the accumulator into mesh with the sectors, will, by the pull on the stud 163, reverse this operation and throw the accumulator out of mesh with the sectors. This occurs in the forward movement of the crank-handle. Before the return movement of the crank-handle the total-key is released and the accumulator control-bar will then be drawn upward by the spring 16 and an inclined stop-portion 306 on its upper side and at its outer end will engage under the stud 162 and be held in such position until the completion of the return stroke of the crank-handle. It will now be apparent that as the sectors 67 rise in the return movement of the crank-handle the adding wheels will not be affected, but will remain in the zero position. At the completion of the return movement of the crank-handle the dog 167 will engage the stud 169 and by rocking the bell-crank lever 145 move the accumulator control-bar 159 outward so that the stop-portion 306 will move from under the stud 162, and the spring 16 acting on the stem 165 will again throw the recess 160 upward into engagement with said stud. It should also be stated that the downward movement of the key 15 is twice as great as that of the eliminating-key 13, which is permitted by the fact that the pivotal connection of the stem of the key 13 is by means of a slot 307 (Fig. 13) working over the pin 295, as previously referred to. This greater movement of the total key permits the total sign 308 on the type-bar 288 to be raised to printing position.

In order to compel the operator to complete the stroke in either the forward or return operations, I provide on the side of the cam-plate 56 (Fig. 3) a rack-bar 309 having a series of recesses therein 310. Pivotally mounted on a stub-shaft 311 secured to one of the side frame-members is a pawl 312 which is journaled on said shaft, and the movement of which is controlled by a coil spring 313 secured at one end to the lower end of said pawl and at its other end to the bottom of the machine. When the cam-plate is turned the pawl will be displaced against the resistance of its spring, and its upper end will engage in one or the other of the recesses 110. If the handle should be released the engagement of the pawl with the rack-bar will prevent the movement in the opposite direction of the cam-plate. When the cam-plate has been moved to its extreme rearmost position the pawl 312 rides off of the rack-bar 309, so that in the return movement of the cam-plate the pawl will be turned by engagement with the rack-bar in the opposite direction to that first described, and by engagement in one or the other of the recesses 110, will prevent the operator from pulling the crank-handle forward after having permitted it to start the return movement. The forward and return movements of the driven shaft 3 are stopped by means of projections 314 and 315 at opposite sides of the cam-plate 56 which engage the said stub-shaft 311 to arrest the movement of the cam-plate in either direction. To control the speed of movement of the driven shaft 3 in both directions I provide the following mechanism (see Fig. 18):

Pivotally secured at one end to the outer end of a crank-arm 316 (shown by dotted lines only) fast on the driven shaft 3, is a piston-rod 317 provided with a piston (not shown) working in a cylinder 318, the lower end of said cylinder being pivotally mounted on the shaft 136, before referred to. The cylinder is provided at opposite ends with ports 319 opening into a duct 320 provided in its side wall. The cylinder is supplied with oil or other fluid, and as the crank-arm 68 is turned downward by the springs 74, as previously described, the speed of movement of this crank-arm will be retarded by the necessity of the piston forcing the oil in front of it through the duct 320 and into the cylinder at the rear of the piston, in the well-known manner. In the event the crank-shaft 2 has been turned too rapidly, in order to permit time for the normal operations of the machine occurring in the forward movement of the crank-handle to take place, I provide for locking the crank-plate 69 against return movement until the springs 74 have completed the throw of the crank-arm 68 to complete the movement of the driven shaft 3. To do this I mount on a bracket-plate 321, secured on the rear frame-member 241ª, a locking-dog 322 which is journaled on a stud 323, and is provided at its outer end with a roller 324 normally seated in the bottom of a cam-groove 325 having a cam-surface 326. The locking-dog is held in this position by means of a coil spring 327 connected at one end to the rear end of the dog and at its other to the bracket 321. The cam-groove 325 is provided in a plate 328 which is pivotally mounted at 329 between the brackets 321. This plate is provided with a downward-projecting tongue 330. The bottom of the groove 325 is also held in engagement with the roller 324 by means of a coil spring 331, connected at one end to the upper side of the plate 328, and at its other to one of the brackets 321. The locking-dog 322 is provided at its end with a locking-recess 332. The crank-plate 69 is provided on its rear side at the bottom with a locking-head 334, which is adapted, in certain movements of the parts, to enter the locking-recess 332. In the normal or proper operation of the machine, the shoulder 188 on the bar 186, before referred to, will engage the tongue 330 to rock it against the resistance of its spring 331 and in this movement the cam-surface 326 engaging the roller 324 will lift the outer end of the locking-dog 322 out of the path of the locking-head 334 so that the latter is free to return with the crank-shaft. If, however, the crank-shaft 2 is turned too rapidly the locking-head 334 will enter the locking-recess 332 before the shoulder 188 engages the nose-piece 330 and will be held in engagement with said locking-recess and against return until released by engagement of the shoulder 188 with the nose-piece 330. In such extreme movement of the crank-shaft 2 it is desirable to limit the throw of the crank-plate 69, and this is effected by a shoulder 335 on the locking-head 334 engaging the stud 323 on which the locking-dog 322 is mounted.

The operations involved in adding and listing, and in the order in which they occur are as follows:

As each key 5 is depressed its key-bar 26 is moved to the rear, releasing the spring catch 42 which locks the key-bar in its retracted position, unlocking the corresponding sector-bar 38 and raising the column-control dog 52. When the desired number of keys have been depressed, representing the number to be added, the crank-handle 19 is then pulled forward. This results in turning the main driven shaft 3 through the medium of the springs 74, which shaft turns the cam-plates 56, 57; the crank-shaft 2 straightens the toggle 137, 139, to restore the carry-overs 100, after which the dog 139 rides off of the bell-crank 135$^a$ to permit the carry-over restorer-plate 127 to spring back to normal; the arm 273 on the driven shaft 3 releases the error-key lock-plate 266, which is turned by its spring to a position under the general-error key, and at the same time moves the dog 268 against the roller 264 on the arm of the general-error key so that on the return movement of the crank the outer end of the error-key lever will be raised to lift the bar 261, which raises and restores the spring catches 42 to normal position to lock the sector-bars and unlock the key-bars; in the movement of the driven shaft 3 the stop-plate 298 is moved from under the stop 296 on the lever 291 connected to the non-add key 13 and total-key 15; then the cam-plates 56, 57 lower the sector-return bar 66, by means of the toggle operated by the rollers 65 in the cam-grooves 58, and the springs 75 draw the sectors 67 down, moving the sector-bars 38 forward, by the engagement of the roller 77 on each bar with the curved groove 80, until the wall of the recess 39 in each sector-bar corresponding to the key depressed engages said key and stops the movement of the bar and sector.

The rod 88 connecting each sector 67 with a type-sector 82 turns the latter, causing it to raise its type-bar 84 to bring the type corresponding to the key depressed to the printing point. As the type-bar raises, its lug 214 releases the tripper-actuator 210 which falls into engagement with the hammer-tripper 222. The stud 197 on the cam-plate 56 then engages the nose 195 on the curved arm 194, rocking its shaft 193 to a stationary position, during which movement the crank-arms 199 on shaft 193, through the connecting rods 201, move the levers carrying the rod 202, to withdraw said rod from beneath the actuators. In this movement the lower end of levers 203, through the links 206, turn levers 207 carrying the tripper-actuators 210, which latter lift the trippers 222 to release the hammer actuators 215, which latter are drawn downward by the springs 236, the stud 235 engaging the wall of the slot 234 to actuate the hammers 231. The hammers to the right, except the last, will be also actuated to print zero. The crank-arm 238 on the shaft 193 during this movement draws the rod 239 inward to set the dog on the paper-feed, so that the latter will be actuated on the return of the parts to normal. In the continuation of movement of the crank-handle and cam-plates 56 and 57, the dog 168 on the driven shaft 3 will engage the stud 170 on the crank-arm 153 and by moving said crank-arm inward break the toggle-joint and move the toggle 155 downward against the resistance of its spring 157$^a$. This movement of the crank-arm 153 causes the bell crank 145 to be rocked to draw the accumulator control-bar 159 and pull the accumulator rearwardly until its pinions engage with the sectors which have been drawn down. In this movement of the bell-crank 145 the toggle-lever 149 will assume a straight position with reference to the crank-arm 147 and thereby temporarily lock the accumulator in mesh with the sectors.

The next series of operations occur on releasing the crank-handle. In this movement of the crank-handle the cam-plates 56 and 57 are moved until the active portion of their cam-grooves engage the rollers 65, when the toggle-arms 61 and 62 are straightened to raise the sectors 67. At the same time the roller 197 on the cam-plate engages the curved surface of the arm 194 and depresses it, thereby rocking shaft 193 in the reverse direction and forcing the hammer-actuator restorer 202 under the hammer actuators and raising them to normal position, while the rod 239 actuates the paper and ribbon feed. Then the toggle 137, 139 breaks, and the dog 139 rides into position on the stud on the bell-crank 135$^a$. The crank-arm 273 on the main driven-shaft 3 depresses error-key stop-plate 266, thereby straightening the toggle-members 267 and 268, causing the latter to turn the lever 259 of the error-key upward, whereby the rod 261 will raise the spring catches 42 which thus release the key-bars and lock the sector-bars. The dog 167 then breaks the toggle at the left of the bell-crank 145 and straightens the toggle at the right side of said bell-crank, which latter forces the accumulator control-bar 159 to the right to disengage the accumulator from the sectors. In the movement upward of the sectors the adding wheels will be turned, and, when the number added is sufficient, the stud 97 on the adding wheel will raise the carry-over lock 119 and permit the guard 115 on the carry-over 100 to spring under the lock and against the stud 124. As the accumulator is thrown out, as above described, the lower ends of the carry-overs are moved away from the carry-over restorer 127 and thus the carry-overs 100 whose lugs have been raised will be drawn inward and their carry-over pawls 105 will engage the corresponding ratchet-wheels 91 to advance them one digit.

When the crank-handle is next pulled forward the toggle at the left of the machine acts to draw the carry-over restorer 127 rearward, as first described and in this operation the upper ends of the carry-overs are moved outward, permitting the dogs 121 to drop behind the guard 115 and the shoulders on the carry-overs, to prevent said carry-overs from being drawn inward until again released, as above described.

The other operations of which the machine is susceptible have been sufficiently described, it is believed, in the body of the specification.

I claim:

1. In an adding machine, in combination with columns of depressible keys, an adding wheel for each column of keys, a sector for actuating each adding wheel, a sector-bar for controlling the movement of each sector, a key-bar located beneath each column of keys, means operated by each key, on depressing it, to move its key-bar to prevent depression of any other key in the column, a locking-member normally holding each sector-bar against movement and adapted to be released by the movement of the key-bar to engage and lock the key-bar in its retracted position and simultaneously to unlock its sector-bar, a plurality of means actuated in the operation of the machine, respectively to restore the sector-bars to normal position and thereupon to move said locking members into engagement with their sector-bars and simultaneously release their engagement with the key-bars, and means for restoring the key-bars to normal position upon their release by said locking-members.

2. In an adding machine, in combination with columns of depressible keys, an adding wheel for each column of keys, a sector for actuating each adding wheel, a sector-bar for controlling the movement of each sector, a key-bar located beneath each column of keys, means operated by each key, on depressing it, to move its key-bar to prevent depression of any other key in the column, a spring catch normally locking each sector-bar against movement and held in such position by the corresponding key-bar, said catch being releasable by the movement of the key-bar to engage and hold the key-bar in its retracted position and simultaneously to unlock its sector-bar, a plurality of means actuated in the operation of the machine, respectively to restore the sector-bars to normal position and thereupon to move said spring-catches into locking engagement with their sector-bars and simultaneously release their engagement with the key-bars, and means for restoring the key-bars to normal position upon such release.

3. In an adding machine, in combination with columns of depressible keys, an adding wheel for each column, a rocking sector for actuating each adding wheel, means tending to rock said sector in one direction and rendered operable on the depression of any one of said keys, a slidable sector-bar corresponding to each column of keys having a part coöperating with its corresponding sector to limit the movement of the sector, and whereby said sector bar is itself actuated in the movement of the sector, and means on each sector-bar for engaging any key depressed in its column to limit the movement of the sector-bar.

4. In an adding machine the combination of a column of successively numbered depressible adding keys, an adding wheel corresponding to said column of keys, a rocking sector for actuating said adding wheel, and a slidable sector-bar, any of said keys, when depressed, projecting into the path of movement of said sector-bar and coöperating therewith to permit a movement of the sector-bar corresponding to that key, said sector-bar and sector having a slidable connection so as to permit of said sector having a constant increase of angular movement corresponding to the successive keys, and whereby the movement of the sector will actuate said sector bar.

5. In an adding machine, in combination with columns of depressible keys, a slidable key-bar mounted beneath each column of keys and provided with cam openings located beneath the respective keys, and with an aperture at its rear end, an actuator carried by each key and adapted to enter one of said openings upon depression of its key to move the other openings in the key-bar out of alinement with the other actuators of the column and thereby prevent depression of their keys, a spring-catch for each key-bar adapted, upon movement of the key-bar, to spring into its aperture and lock the key-bar in retracted position, an adding wheel sector for each column of keys, a slidable sector-bar for controlling the movement of each sector, means carried by each spring-catch for locking a sector bar against movement and adapted to be moved out of locking engagement therewith when the spring catch engages in the aperture of its key-bar, means for restoring the spring-catches to locking position with the sector-bars when the latter have been restored to normal position, thereby simultaneously releasing the key-bars, and means for restoring each key-bar to normal position upon its release by its spring-catch.

6. In an adding machine, in combination with columns of depressible keys, adding wheel sectors, a slidable sector-bar associated with each column of keys for controlling the movement of a corresponding sector, a slidable key-bar mounted beneath each column of keys, means operated by each key, on depressing it, to move its key-bar into the path of all the other keys of the column to prevent depression of any other key in the column, and automatic means, coacting with each key-bar and a corresponding sector-bar, normally locking the sector-bar against movement, and releasable upon movement of the key-bar to lock the key-bar in its retracted position and simultaneously release the sector-bar.

7. In an adding machine, in combination with sectors and means for actuating the same, an accumulator pivotally mounted in the machine and having studs located, respectively, above and below its pivot, a bar provided with recesses located, respectively, on its upper and lower sides, said upper recess being normally in releasable engagement with said upper stud, means for actuating said bar to move the accumulator into or out of operative relation with said sectors while its upper recess is so engaged, a key operatively connected with said bar and depressible to move the under recess of said bar into engagement with said lower stud to turn the accumulator by contact with said stud into operative relation with the sectors, and upon being maintained in such engagement to turn the accumulator out of such relation at a given stage in the operation of the machine, means for locking said bar in the extreme position in either direction to which it is moved by its actuator, and means actuated in the operation of the machine for releasing said locking means.

8. In an adding machine, in combination with sectors and means for actuating the same, an accumulator pivotally mounted in the machine and normally out of engagement with said sectors and having an upper and lower engaging member, a bar releasably engaging said upper engaging member, a key operatively connected with said bar and depressible to move said bar into engagement with the lower engaging member to turn by contact the accumulator into operative relation with the sectors, and a stop normally preventing the movement of said bar into engagement with the lower engaging member and adapted to be moved in the initial operation of the machine to permit such engagement.

9. In an adding machine, in combination with sectors and means for actuating the same, an accumulator pivotally mounted in the machine and having an upper and lower engaging member, a bar releasably engaging said upper engaging member, means for actuating said bar, a total key operatively connected with said bar and depressible to move the bar into contact with said lower engaging member to turn the accumulator into operative relation with the sectors, a pivotally mounted lever connected at one end with said total key, an eliminating key connected to said lever and a stop normally preventing the movement of said bar into engagement with the lower engaging member and permitting movement of said lever by the eliminating key to move said bar out of engagement with said upper engaging member, said stop being movable in the initial operation of the machine in advance of the actuation of said bar to permit the full depression of said total key.

10. In an adding machine, in combination with an accumulator, actuators coöperating therewith in the normal operation of the machine, mechanism coöperating with the accumulator for permitting totals and sub-totals to be taken, means for actuating said mechanism, a key for controlling said mechanism, and a stop normally preventing the full depression of said key for taking a total or sub-total and movable by the machine, in advance of the actuation of said mechanism, to permit of such depression.

11. In an adding machine, in combination with an accumulator, actuators coöperating therewith in the normal operation of the machine, mechanism coöperating with the accumulator for permitting totals and sub-totals to be taken and for preventing addition, a total key and a non-add key controlling said mechanism, and a stop normally preventing the full depression of the total key until the machine has been placed in operation, but normally permitting the depression of the non-add key to secure the action of elimination by the machine.

12. In an adding machine, in combination with an accumulator, actuating mechanism coöperating therewith in the normal operation of the machine, carry-overs coöperating with said accumulator, mechanism cooperating with the accumulator for permitting totals and sub-totals to be taken, a key for controlling said mechanism, a carry-over restorer, means for actuating the same, and a stop normally preventing the full depression of said key until the carry-over restorer has been actuated by the machine to restore the carry-overs to normal.

13. In an adding machine, in combination with an accumulator, actuators adapted to coöperate therewith in the normal operation of the machine, a series of pivoted carry-overs coöperating with said accumulator and having engaging members, a slide member common to said pivoted carry-overs, springs controlling the same, and means operated by the machine in its initial movement to first draw said slide-member into contact with said engaging members to restore the carry-overs to normal and then to release said slide member to permit it to be drawn back by its springs from contact with said engaging members.

14. In an adding machine, in combination with an accumulator, actuators adapted to coöperate therewith in the normal operation of the machine, pivoted carry-overs coöperating with said accumulator and having projecting end portions, a slide-plate, springs controlling the same, rods connected to said plate, pivoted bell-cranks having each a member operatively connected to said rods, toggle - members releasably engaging the other members of said bell cranks, and means for actuating said toggle-members, whereby, in the operation of the machine, said toggles will tend to straighten and thereby turn said bell-cranks to draw the slide-plate into contact with the ends of said carry-over restorers to return the restorers to normal and will then move off of the bell-cranks to permit the springs to return the slide-plate to normal.

15. In an adding machine, in combination with an accumulator having upper and lower engaging members, actuators adapted to coöperate with the accumulator in the normal operation of the machine, an accumulator control-bar normally and releasably engaging said upper engaging member, a total key and an eliminating key operatively connected with said control-bar, said total key being depressible to move the control-bar into engagement with said lower engaging member, and said eliminating key being depressible to move the control-bar a distance sufficient only to free it from engagement with said upper engaging member, a type-bar movable by the depression of either of said keys and having a character thereon for indicating elimination and also sub-total, and a stop on said control-bar for engaging the upper engaging member on release of the total-key to arrest said type-bar in the same position it would be placed by depressing the eliminating key.

16. In an adding machine, in combination with an accumulator, actuators adapted to coöperate therewith in the normal operation of the machine, mechanism adapted to coöperate with the accumulator for permitting totals and sub-totals to be taken, a total-key controlling said mechanism, number keys for controlling said actuators, a movable member under said keys and normally permitting their depression and movable by any of said number keys to prevent the depression of the rest of the number keys, and means actuated by said total-key on depressing the same to move said member to prevent depression of the number keys.

17. In an adding machine, in combination with columns of depressible number keys, an accumulator, actuators adapted to coöperate with said accumulator in the normal operation of the machine, bars for controlling the movement of said actuators, a key-bar located beneath each column of keys and normally permitting depression of the keys, and movable by the depression of each key to prevent depression of the other keys in the column, a locking device normally locking each actuator-bar against movement and adapted to be released by the movement of the key-bar to engage and lock the latter in its retracted position and to simultaneously unlock its actuator bar, mechanism adapted to coöperate with the accumulator to permit totals and sub-totals to be taken, a total-key controlling said mechanism, and means actuated by said total-key on depressing the same to move all of said key-bars into locking position and simultaneously release all of said actuator-bars.

18. In an adding machine, in combination with an accumulator comprising a series of adding wheels each of which is provided on its side with a stop, a series of sectors adapted to coöperate with said accumulator in the normal operation of the machine, means for permitting the machine to take totals or sub-totals comprising mechanism for moving the accumulator into operative relation with the sectors while in their normal position, a series of carry-overs adapted to coöperate with said adding wheels, and a series of locking members normally locking the carry-overs in inoperative position, located in the paths of said stops, adapted to be actuated thereby in the normal operation of the machine to release said carry-overs, said locking members mounted so that in the operations of totaling or sub-totaling they will be engaged by said stops to arrest the adding wheels at zero.

19. In an adding machine, in combination with an accumulator comprising a series of adding wheels each of which is provided on its side with a stop, a series of sectors, columns of keys, means, on depressing a key, for causing the downward movement of each sector a distance governed by the key depressed, means for turning the accumulator into operative relation with said sectors after they have been actuated, means for restoring the sectors to normal to thereby rotate the adding wheels, means for permitting the machine to take totals or sub-totals comprising mechanism for moving the accumulator into operative relation with the sectors while in their normal position, a series of carry-overs adapted to coöperate with said adding wheels, and a series of members normally locking the carry-overs in inoperative position, located in the paths of said stops, adapted to be actuated thereby in the normal operation of the machine to release said carry-overs, and in the operations of totaling or sub-totaling to be engaged by said stops to arrest the adding wheels at zero.

20. In an adding machine, in combination with an accumulator pivotally mounted in the machine and comprising a series of adding wheels each of which is provided on one side with a stop, said accumulator having an upper and a lower engaging member, a series of sectors and means for actuating the same, means for permitting the machine to take totals or sub-totals comprising an actuating member, a spring-controlled bar pivotally connected thereto and releasably engaging said upper member, a key operatively connected with said bar and depressible to move the latter into contact with said lower engaging member to turn the accumulator into operative relation with the sectors while in their normal position, means controlled by the depression of said key for releasing and permitting the actuation of all of said sectors on placing the machine in operation, a series of pivoted dogs located in the paths of said stops and adapted in the operation of the sectors aforesaid to be engaged by said stops to arrest the adding wheels at zero and simultaneously stop the movement of the sectors, means operating to cause said actuating member to move said bar while in engagement with the lower engaging member to turn the accumulator out of operative relation with the sectors while the latter are in the positions in which they have been arrested by said stops, and means for restoring the sectors to normal position while out of engagement with the accumulator.

21. In an adding machine, in combination with an accumulator pivotally mounted in the machine, a series of sectors mounted to rock, a series of depressible successively numbered keys corresponding to each sector, a slidable sector bar corresponding to each series of keys, each sector having a cam, and each corresponding sector-bar having a part coöperating with the cam to limit the rocking movement of the sector, means on each sector-bar for engaging the depressed key to stop the movement of the sector, means for turning the accumulator into operative relation with said sector, and means for restoring the sectors to normal, said cam operating to give each segment a constant increase of angular movement corresponding to the successive keys.

22. In an adding machine, in combination with an accumulator pivotally mounted in the machine, actuators for said accumulator, a pivotally mounted member, a bar operatively connected with said member and said accumulator, means for rocking said member whereby, through the medium of said bar, to move the accumulator into and out of operative relation, respectively, with said actuators, toggle connections for locking said member in its extreme position in either direction of its movement, and means actuated in the operation of the machine for releasing said toggle connections.

23. In an adding machine, in combination with an accumulator pivotally mounted in the machine, actuators therefor, a pivoted member, a bar operatively connected with said member and said accumulator, a shaft, means for rocking the same, a pair of toggle-members pivotally connected to opposite sides of said member, one of said toggles being normally straight, and means actuated by the shaft in its movement in one direction to break the straight toggle and rock said member to draw the accumulator into operative relation with its actuators and thereupon straighten the other toggle, and means actuated in the reverse movement of the shaft to break the latter toggle and rock said member to move the accumulator out of operative relation with the sectors and to straighten the first-named toggle-member.

24. In an adding machine, in combination with an accumulator pivotally mounted in the machine, actuators therefor, a pivoted member, a bar operatively connected with said member and said accumulator, a shaft, means for rocking the same, a pair of toggle-members pivotally connected to opposite sides of said member, one of said toggles being normally straight, springs tending normally to straighten said toggle-members, and means actuated by the shaft in itse movement in one direction to break the straight toggle against the resistance of its spring and rock said member to draw the accumulator into operative relation with the actuators and thereupon straighten the other toggle, and means actuated in the reverse movement of the shaft to break the latter toggle against the resistance of its spring and rock said member to move the accumulator out of operative relation with the actuators and to straighten the first-named toggle-member.

25. In an adding machine, in combination with an accumulator pivotally mounted in the machine, actuators therefor, a pivoted member, a bar pivotally connected to said member and releasably engaging said accumulator on one side of the latter's pivot, means for moving said bar into releasable engagement with the accumulator on the opposite side of said pivot, whereby, in the same movement of the bar, the accumulator will be moved into or out of operative relation with said actuators according to the position of said bar, means for rocking said pivoted member to move said bar, means for locking said pivoted member in its extreme position in either direction, and means actuated in the operation of the machine for releasing said locking means.

26. In an adding machine, in combination with an accumulator, a series of sectors for actuating the same, a spring connected to each sector and tending normally to draw it downwardly, a series of adding keys, automatic means normally locking each sector and releasable upon depression of any key of said series, means for moving the accumulator into operative relation with said sectors comprising a driven shaft, a crank-plate thereon having a cam groove, pivotally mounted arms, a rod supported in said arms and extending beneath said sectors, and means actuated by the cam groove in said crank-plate in the operation of the machine to lower said bar to permit movement of the sectors and then to raise said bar to elevate the sectors to locking position.

27. In an adding machine, in combination with an accumulator, a series of sectors for actuating the same normally locked against movement, a spring connected to each sector and tending normally to draw it downwardly, a series of adding keys, means governed by any of said keys for releasing the sectors, means for moving the accumulator into operative relation with said sectors comprising a driven shaft, a crank-plate thereon having a cam groove, pivotally mounted arms, a rod supported in said arms and extending beneath said sectors, and a toggle-member pivotally engaged with said arms and having operative engagement with said cam groove whereby, in the operation of the machine, said toggle will be moved in one direction to lower said bar to permit the downward movement of the sectors and then be moved in the opposite direction to raise said bar and thereby elevate the sectors.

28. In an adding machine, in combination with adding wheels and a series of pivotally mounted sectors for actuating the same, slidably mounted type bars having racks, a series of type sectors in engagement with said racks for actuating the type bars, a link pivotally connecting each adding wheel sector with a type sector, and means for actuating said adding wheel sectors, whereby the type bars will be moved proportionately to the movement of the adding wheel sectors.

29. In an adding machine, in combination with adding wheels, a series of pivoted sectors for actuating the same, slidably mounted type bars having racks, a series of pivoted sectors in engagement with said racks for actuating the same, links pivotally connected at opposite ends to the respective adding wheel and type sectors and being located to one side of the pivots of said sectors, whereby movement of an adding wheel sector in one direction will move a type sector in the opposite direction a corresponding amount, and means for actuating said adding wheel sectors.

30. In an adding machine, in combination with type bars, carrying racks, a main shaft, means for actuating the same, a series of sectors loosely mounted on said shaft and engaging said racks for actuating said type bars, a driven shaft, means for actuating the same from said main shaft, adding wheels, a series of sectors loosely mounted on said driven shaft for actuating said adding wheels, links pivotally connecting said adding wheel and type sectors, springs tending normally to draw said adding wheel sectors downward, and means actuated by the driven shaft for restoring said sectors to normal.

31. In an adding machine, in combination with adding wheels and sectors for actuating the same, means for actuating the sectors, an actuating shaft, a cam plate thereon, means operated by said cam plate to restore the sectors to normal position after their actuation, means for listing the numbers added comprising hammer mechanism, and means for actuating said hammer mechanism comprising a shaft 193, a crank-arm fast on said shaft, means operatively connecting said crank-arm with said hammer mechanism, an arm 194 fast on said shaft 193 having a cam-surface, a nose-piece at one end of said arm facing said cam surface, and a stud on said cam-plate adapted, in the movement of the machine, to engage said nose-piece to raise the arm 194 and thereby rock the shaft 193 and move its crank-arm to operate the hammer mechanism after the sectors have been actuated, and to engage the cam-surface of said arm to rock the shaft 193 in the reverse direction to restore the hammer mechanism to normal as the cam-plate is moved to restore the adding wheel sectors to normal.

32. In an adding machine, in combination with adding wheel sectors and means for actuating the same, an actuating shaft, a cam-plate thereon, means actuated by the cam-plate to restore the sectors to normal, means for listing the numbers added comprising hammer mechanism and a paper feed, and means for actuating these latter elements comprising a shaft 193, crank-arms thereon, means operatively connecting said crank-arms with said paper feed and hammer mechanism, respectively, a plate fast on said shaft 193 and having a cam-surface and a nose-piece, and a stud on said cam-plate adapted to engage said nose-piece in the movement of the cam-plate in one direction to raise said arm whereby to rock the shaft 193 and through its cranks and connections to actuate the hammer mechanism and set the paper feed, and in the movement in the other direction of said cam-plate to engage the cam-surface of said plate to rock the shaft 193 in the reverse direction whereby, through said cranks and connections, to operate the paper feed and restore the hammer mechanism to normal position.

33. In an adding machine, in combination with rows of depressible keys, a key bar slidably mounted beneath each row of keys and movable to a retracted position on the depression of any key in its row, a sector and and actuating sector bar therefor corresponding to each row of keys, a series of locking members each of which normally locks one of said sector-bars and is adapted to be released on the movement of a key bar to release its corresponding sector bar and engage and hold its corresponding key bar in its retracted position, a bar located beneath said locking members, and lever mechanism supporting said bar and including a depressible key, whereby on depressing said key said bar will be raised by the lever mechanism to lift said locking members from engagement with the key bars, and means for restoring the key bars to normal position when thus released.

34. In an adding machine, in combination with rows of depressible keys, a key bar slidably mounted beneath each row of keys and movable by the depression of a key to a retracted position, a series of locking members, each of which is adapted to be released by the movement of a key bar to engage and hold the key bar in its retracted position, a bell-crank lever, a rod carried thereby and located beneath said locking members, a general error key for operating said bell crank lever and having a shoulder, a stud on said bell-crank, a pivotally-mounted stop-plate, a spring-controlled pivoted dog carried thereby and coöperating with said stud but normally out of engagement therewith, a contact-member on said stop-plate, a spring tending normally to move said stop-plate in one direction, an actuating shaft, a crank-arm thereon normally engaging said stop-plate and preventing movement thereof by its spring, whereby in the movement of said shaft in one direction said crank-arm will release the stop-plate and the latter will be drawn by its spring beneath said general error key to prevent depression of the same, and said dog will be turned against the resistance of its spring into engagement with the stud of the bell-crank lever, and upon the movement of said shaft in the opposite direction its crank-arm will engage said stop-plate to turn the same from beneath the general error key, and force said dog against said stud to operate the bell-crank lever and thereby raise said bar to cause it to lift said locking members out of engagement with the key-bars and will then move said dog out of engagement with said stud, a spring for returning said bell-crank lever to normal when so released, and means for returning the key bars to normal when released by said locking members.

35. In an adding machine, in combination with rows of depressible keys, a key bar slidably mounted beneath each row of keys and movable on the depression of any key in a column to a retracted position, a series of locking members, each of which is adapted to be released on the movement of its key bar to engage and hold such key bar in its retracted position, adding wheel sectors, means for actuating the same, a controlling member for each sector adapted to be released by such movement of a locking member, a plurality of means actuated in the operation of the machine for returning the adding wheel sectors and their controlling members to normal position and for releasing said locking members from engagement with said key-bars and turning them into engagement with said controlling members, said means including a spring-actuated member, an actuating shaft, and an arm thereon normally preventing movement of said member, and a depressible repeat key having operative connection with said member and adapted, on being moved to a depressed position, to prevent the movement of said member by its spring upon its release by said arm, whereby the sectors previously released will be continuously actuated in the operation of the machine until said repeat key is returned to normal position.

36. In an adding machine, in combination with a pivoted accumulator, actuators therefor, a control-bar releasably engaging the accumulator, means for actuating said control-bar to turn the accumulator into and out of operative relation with its actuators, a key board, a total-key stem passing down through said key-board connected to said control-bar, and a non-add-key for actuating said control-bar by exerting force through the said total-key stem.

37. In an adding machine, in combination with a pivoted accumulator, actuators therefor, a control-bar releasably engaging the accumulator, means for actuating said control-bar to turn the accumulator into and out of operative relation with its actuators, a total-key stem pivotally connected to said control-bar, a pivotally-mounted lever having a slotted engagement at its end with said stem, and a non-add-key stem having slotted engagement with said lever intermediate its ends.

38. In an adding machine, in combination with an accumulator, sectors for actuating the same, means for actuating said sectors, a sector-control bar operatively connected with and movable by the sector, adding keys, a stop rendered operative on the depression of each key to engage and arrest the movement of the sector-control bar, and means on the sector co-acting with said sector-control bar to thereupon arrest the movement of the sector.

39. In an adding machine, in combination with an accumulator, sectors for actuating the same, means for actuating said sectors, a sector-control bar operatively connected with and movable by the sector, adding keys, stop mechanism rendered operative on the depression of each key to engage its corresponding sector-bar to determine the length of, and arrest the movement of the sector-control bar, and means on the sector co-acting with said sector-control bar to thereupon arrest the movement of the sector.

40. In an adding machine, in combination with an accumulator, sectors for actuating the same, means for actuating said sectors, a sector-control bar operatively connected with and movable by the sector, means for guiding the sector-control bars to cause them to move in right lines, adding keys, a stop rendered operative on depression of each key to engage and arrest the movement of a sector-control bar, and means on the sector co-acting with said sector-control bar to thereupon arrest the movement of the sector.

41. In an adding machine, in combination with an accumulator, sectors for actuating the same, means for actuating said sectors, a cam groove provided on each sector and having in one edge locking recesses, a sector-control bar having a downwardly-extending arm, a roller on said arm working in said cam groove and engaging said recessed edge, whereby the movement of a sector will actuate its sector-control bar, adding keys, and stop mechanism rendered operative on the depression of each key to determine the length of, and arrest the movement of a sector-control bar with its roller in one of said recesses, whereby to simultaneously lock the sector against movement.

42. In an adding machine, in combination with an accumulator, sectors for actuating the same, means for actuating said sectors, a cam groove provided on each sector and having in one edge locking recesses, a sector-control bar having a downwardly-extending arm, a roller on said arm working in said cam groove and engaging said recessed edge, whereby the movement of a sector will actuate its sector-control bar, means for guiding the sector-control bars to cause them to move in right lines, adding keys, and stop mechanism rendered operative on the depression of each key to determine the length of, and arrest the movement of a sector-control bar with its roller in one of said recesses, whereby to simultaneously lock the sector against movement.

43. In an adding machine, in combination with an accumulator, sectors for actuating the same, a sector-control bar operatively connected with each sector and movable thereby, adding keys, a stop rendered operative on the depression of each key to arrest the movement of a sector-control bar, means on the sector co-acting with said sector-control bar to thereupon arrest the movement of the sector, and means for causing the sector-control bar to move in right lines comprising a guide member on the top thereof slidably engaging a straight portion of the machine, a rearwardly-extending foot-piece on said sector-control bar, and means on the machine for slidably supporting said foot-piece.

44. In an adding machine, in combination with columns of depressible keys, an adding wheel for each column, a rocking sector for actuating each adding wheel, a slidable sector-bar corresponding to each column of keys, means tending to rock each sector, each sector having a cam and each corresponding sector-bar having a part coöperating with its corresponding cam to limit the rocking movement of the sector and means for controlling the amount of movement of said sector-bars by said keys.

45. In an adding machine, in combination with columns of depressible keys, an adding wheel for each column, a rocking sector corresponding to each adding wheel, means tending to rock each sector to actuate its corresponding adding wheel, a slidable sector-bar corresponding to each column of keys, each sector-bar and its corresponding sector having a connection between them including a cam whereby a movement of said sector by its actuating means effects the movement of its corresponding sector-bar, said keys operating to limit the movement of said sector-bars.

46. In an adding machine, the combination of a column of successively numbered depressible keys, an adding wheel corresponding to said column of keys, a locking sector for actuating said adding wheel, a slidable sector bar controlling in common all of said keys, said sector bar having a pin moving with said sector bar in a substantially straight line, and said sector having a slot engaging said pin and coöperating therewith when the sector bar slides, to engage the pin at a plurality of successive points in said slot and thereby hold said sector in a plurality of successive positions of rotation about its axis.

In testimony whereof, I have hereunto set my hand in presence of two subscribing witnesses.

WALTER F. McCALEB.

Witnesses:
 EDWIN HOBBY,
 O. M. COOPER.